(12) United States Patent
Dasgupta et al.

(10) Patent No.: US 11,323,324 B2
(45) Date of Patent: May 3, 2022

(54) AUTOMATED CLOSED-LOOP ACTIONS IN A NETWORK USING A DISTRIBUTED LEDGER

(71) Applicant: Extreme Networks, Inc., San Jose, CA (US)

(72) Inventors: Shubharanjan Dasgupta, Bangalore (IN); Mythil Raman, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 64 days.

(21) Appl. No.: 16/798,215

(22) Filed: Feb. 21, 2020

(65) Prior Publication Data

US 2020/0274765 A1 Aug. 27, 2020

Related U.S. Application Data

(60) Provisional application No. 62/809,231, filed on Feb. 22, 2019.

(51) Int. Cl.
*H04L 12/24* (2006.01)
*H04L 41/0823* (2022.01)
(Continued)

(52) U.S. Cl.
CPC ........ *H04L 41/0823* (2013.01); *H04L 9/0643* (2013.01); *H04L 43/0888* (2013.01);
(Continued)

(58) Field of Classification Search
CPC ............. H04L 41/0823; H04L 43/0888; H04L 45/745; H04L 47/24; H04L 47/32;
(Continued)

(56) References Cited

U.S. PATENT DOCUMENTS 9,930,012 B1 3/2018 Clemons, Jr.
2010/0130170 A1 5/2010 Liu et al.
(Continued)

OTHER PUBLICATIONS

International Search Report and Written Opinion of the International Searching Authority directed to related International Patent Application No. PCT/US2020/019315, dated Jun. 17, 2020; 11 pages.
(Continued)

*Primary Examiner* — Jackie Zuniga Abad
(74) *Attorney, Agent, or Firm* — Sterne, Kessler, Goldstein & Fox P.L.L.C.

(57) ABSTRACT

Disclosed herein are system, method, and computer program product embodiments for analyzing a network. An embodiment operates by a third-party component deriving network data based on a received data packet from a network component configured to perform a network function. The third-party component orders a transaction including second network data from a distributed ledger. The third-party component determines that the first and second network data meet or exceed a condition of a smart contract comprising the condition and an associated network action related to the network function. The third-party component sends the condition of the smart contract and the first and second network data to another third-party component. The third-party component receives a validation that the first and
(Continued)

second network data meet or exceed the first condition of the first smart contract and performing the first network action on the network.

20 Claims, 20 Drawing Sheets

(51) Int. Cl.
| | |
|---|---|
| H04L 9/06 | (2006.01) |
| H04L 47/36 | (2022.01) |
| H04L 67/53 | (2022.01) |
| H04L 43/0888 | (2022.01) |
| H04L 45/745 | (2022.01) |
| H04L 47/24 | (2022.01) |
| H04L 47/32 | (2022.01) |
| H04L 61/5007 | (2022.01) |

(52) U.S. Cl.
CPC ............ *H04L 45/745* (2013.01); *H04L 47/24* (2013.01); *H04L 47/32* (2013.01); *H04L 47/36* (2013.01); *H04L 61/2007* (2013.01); *H04L 67/20* (2013.01); *H04L 2209/38* (2013.01)

(58) Field of Classification Search
CPC ... H04L 61/2007; H04L 9/0643; H04L 47/36; H04L 67/20; H04L 2209/38
See application file for complete search history.

(56) References Cited

U.S. PATENT DOCUMENTS

| | | |
|---|---|---|
| 2013/0003607 A1 | 1/2013 | Kini et al. |
| 2013/0250799 A1 | 9/2013 | Ishii |
| 2015/0244842 A1 | 8/2015 | Laufer et al. |
| 2015/0257159 A1 | 9/2015 | Speicher et al. |
| 2015/0358434 A1 | 12/2015 | Parthasarathy et al. |
| 2016/0020993 A1 | 1/2016 | Wu et al. |
| 2016/0294776 A1 | 10/2016 | Sun et al. |
| 2017/0132615 A1 | 5/2017 | Castinado et al. |
| 2017/0140408 A1 | 5/2017 | Wuehler |
| 2017/0163685 A1 | 6/2017 | Schwartz et al. |
| 2018/0152385 A1 | 5/2018 | Xu et al. |
| 2019/0043050 A1* | 2/2019 | Smith .................. G06Q 20/223 |
| 2020/0090208 A1* | 3/2020 | Reichenbach ......... G06Q 40/08 |
| 2020/0272493 A1 | 8/2020 | Lecuyer et al. |
| 2020/0274787 A1 | 8/2020 | Dasgupta et al. |

OTHER PUBLICATIONS

International Search Report and Written Opinion of the International Searching Authority directed to related International Patent Application No. PCT/US2020/019318, dated Jun. 12, 2020; 14 pages.

* cited by examiner

AUTOMATED CLOSED-LOOP ACTIONS IN A NETWORK USING A DISTRIBUTED LEDGER

CROSS-REFERENCE TO RELATED APPLICATION

This application claims the benefit of U.S. Provisional Patent Application No. 62/809,231, filed on Feb. 22, 2019, which is herein incorporated by reference in its entirety.

BACKGROUND

Network hosts are continually concerned about the experience that users have on their network, in terms of latency and bandwidth efficiency. The user experience can depend on a number of different variables, such as the number of network users and user behavior on the network (e.g., time spent on the network, time of day on the network, and applications used on the network). Given the constant flow of network information provided to users, improving network latency and bandwidth efficiency can be challenging.

SUMMARY

In some embodiments, a method is provided that includes receiving, by a third-party component from a network component, a copy of a first data packet related to a user component in a network. The network component is configured to perform a first network function. The method also includes deriving, by the third-party component, first network data based on the copy of the first data packet, and ordering, by the third-party component from a distributed ledger, a transaction relating to the first network data. The transaction comprises second network data derived from a previous data packet. The method further includes determining, by the third-party component, that the first and second network data meet or exceed a first condition of a first smart contract that includes the first condition and an associated first network action related to the first network function. The method further includes sending, by the third-party component, the first condition of the first smart contract and the first and second network data of the first data packet to another third-party component. The method also includes receiving, by the third-party component from the other third-party component, a validation that the first and second network data meet or exceed the first condition of the first smart contract, and performing the first network action on the network.

In some embodiments, a system including a memory and a processor coupled to the memory is provided. The processor is configured to receive, by a third-party component from a network component, a copy of a first data packet related to a user component in a network. The network component is configured to perform a first network function. The processor is also configured to derive, by the third-party component, first network data based on the copy of the first data packet, and order, by the third-party component from a distributed ledger, a transaction relating to the first network data. The transaction includes second network data derived from a previous data packet. The processor is further configured to determine, by the third-party component, that the first and second network data meet or exceed a first condition of a first smart contract that includes the first condition and an associated first network action related to the first network function. The processor is further configured to send, by the third-party component, the first condition of the first smart contract and the first and second network data of the first data packet to another third-party component. The processor is further configured to receive, by the third-party component from the other third-party component, a validation that the first and second network data meet or exceed the first condition of the first smart contract, and performing the first network action on the network.

In some embodiments, a non-transitory computer-readable device having instruction stored thereon is provided. The instructions, when executed by a computing device, cause the computing device to perform operations, including receiving, by a third-party component from a network component, a copy of a first data packet related to a user component in a network. The network component is configured to perform a first network function. The operations also include deriving, by the third-party component, first network data based on the copy of the first data packet, and ordering, by the third-party component from a distributed ledger, a transaction relating to the first network data. The transaction includes second network data derived from a previous data packet. The operations further include determining, by the third-party component, that the first and second network data meet or exceed a first condition of a first smart contract that includes the first condition and an associated first network action related to the first network function. The operations also include sending, by the third-party component, the first condition of the first smart contract and the first and second network data of the first data packet to another third-party component. The operations further include receiving, by the third-party component from the other third-party component, a validation that the first and second network data meet or exceed the first condition of the first smart contract and performing the first network action on the network.

In some embodiments, the third-party component identifies the first smart contract based on one or more of the first network data and the first network function. In some embodiments, the third-party component identifies the first smart contract among the first smart contract and the second smart contract based on the first and second network data. The second smart contract includes a second condition and an associated second network action. In some embodiments, the third-party component stores the first smart contract at the third-party component or on the distributed ledger. In some embodiments, the network component and/or the third-party component is located at an edge of the network. In some embodiments, the network component and/or the third-party component is located at a center of the network. In some embodiments, the network function includes performing a corrective action or preventive action in response to the first and second network data. In some embodiments, the corrective action or preventive action relates to application scaling for one or more user devices or cost optimization for the network.

In some embodiments, a method is provided that includes receiving, by a first network host from a second network host in a network, a first metadata relating to a copy of a first data packet. The first network host includes a first network entity supporting one or more user devices in the network. The first network host and the second network host maintain a first distributed ledger storing the first metadata and a second metadata. The method also includes comparing, by the first network host or the first network entity, the first metadata and the second metadata to a condition of a smart contract stored by the first network host or the first network entity. The smart contract includes the condition and a recommended action. The condition relates to a metadata threshold. The recommended action relates to creating a second network entity for supporting the one or more user devices in the network such that the first network host includes the first network entity and the second network entity. The method further includes determining, by the first network host or the first network entity, that the first metadata together with the second metadata meet or exceed the metadata threshold such that the condition of the smart contract is fulfilled and the recommended action is triggered. The method also includes performing, by the first network host or the first network entity, the recommended action of the smart contract such that the first network host includes the first network entity and the second network entity and that the first network host improves the support of the one or more user devices.

In some embodiments, a system including a memory and a processor coupled to the memory is provided. The processor is configured to receive, by a first network host from a second network host in a network, a first metadata relating to a copy of a first data packet. The first network host includes a first network entity supporting one or more user devices in the network. The first network host and the second network host maintain a first distributed ledger storing the first metadata and a second metadata. The processor is also configured to compare, by the first network host or the first network entity, the first metadata and the second metadata to a condition of a smart contract stored by the first network host or the first network entity. The smart contract includes the condition and a recommended action. The condition relates to a metadata threshold. The recommended action relates to creating a second network entity for supporting the one or more user devices in the network such that the first network host includes the first network entity and the second network entity. The processor is further configured to determining, by the first network host or the first network entity, that the first metadata together with the second metadata meet or exceed the metadata threshold such that the condition of the smart contract is fulfilled and the recommended action is triggered. The processor is also configured includes performing, by the first network host or the first network entity, the recommended action of the smart contract such that the first network host includes the first network entity and the second network entity and that the first network host improves the support of the one or more user devices.

In some embodiments, a non-transitory computer-readable device having instruction stored thereon is provided. The instructions, when executed by a computing device, cause the computing device to perform operations, including receiving, by a first network host from a second network host in a network, a first metadata relating to a copy of a first data packet. The first network host includes a first network entity supporting one or more user devices in the network. The first network host and the second network host maintain a first distributed ledger storing the first metadata and a second metadata. The operations also includes comparing, by the first network host or the first network entity, the first metadata and the second metadata to a condition of a smart contract stored by the first network host or the first network entity. The smart contract includes the condition and a recommended action. The condition relates to a metadata threshold. The recommended action relates to creating a second network entity for supporting the one or more user devices in the network such that the first network host includes the first network entity and the second network entity. The operations further include determining, by the first network host or the first network entity, that the first metadata together with the second metadata meet or exceed the metadata threshold such that the condition of the smart contract is fulfilled and the recommended action is triggered. The operations also include performing, by the first network host or the first network entity, the recommended action of the smart contract such that the first network host includes the first network entity and the second network entity and that the first network host improves the support of the one or more user devices.

In some embodiments, the first network host receives the second metadata from the second network host. The first network host then generates a transaction relating to the second metadata and stores the transaction on the first distributed ledger. After receiving the first metadata, the first network host updates the transaction on the first distributed ledger with the second metadata, such that the transaction includes the first metadata and the second metadata. In some embodiments, the first network host generates a first transaction relating to the recommended action and stores the first transaction on the first distributed ledger. In some embodiments, the first distributed ledger includes a blockchain having an initial block corresponding to an initial transaction. In some embodiments, to store the transaction, the first network host generates a first block that includes the first transaction and links the first block to the initial block. In some embodiments, the first network host accesses a first channel among the first channel and a second channel. The first channel relates to the first distributed ledger, and the second channel relates to a second distributed ledger for storing the first metadata and the second metadata. The first block is linked to the initial block after accessing the first channel. In some embodiments, the transaction relating to the recommended action includes the first metadata, the second metadata, and the smart contract. In some embodiments, the first network host sends the transaction to the second network host for verification that the first metadata and the second metadata meet or exceed the condition of the smart contract. After the first network host receives the verification, the first network host performs the recommended action.

In some embodiments, the first network host receives a prediction for a period of time related to the first entity of the first network host that supports one or more user devices in the network. The first and second metadata meeting or exceeding the metadata threshold is based on the prediction. In some embodiments, the first network entity and the second network entity support an application capable of being processed by the one or more user devices. In some embodiments, the second network entity and the second network host are configured to process a second application different from the first application.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a more efficient and trusted manner to analyze data upon receipt.

Figure 1:
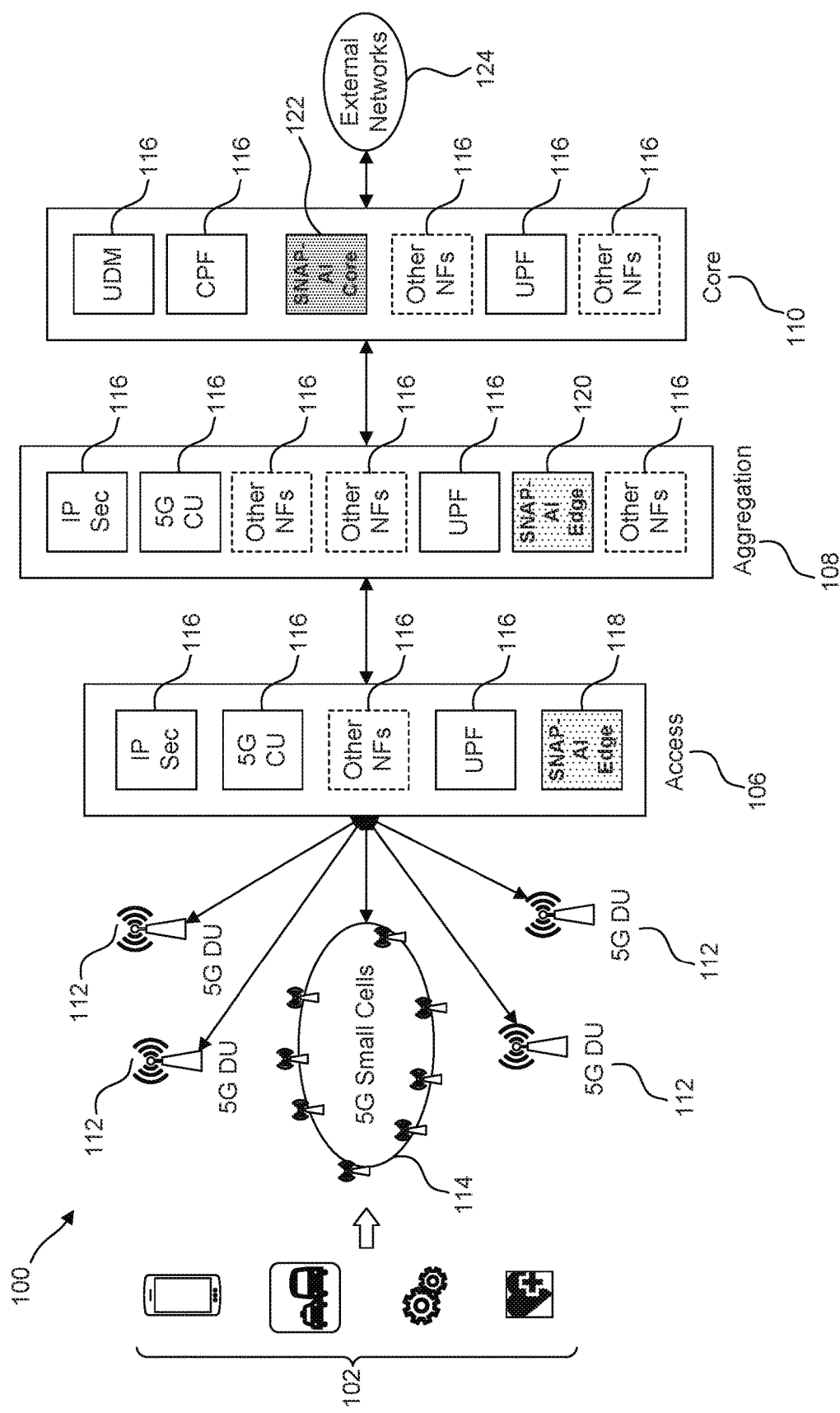
FIG. 1 illustrates a system for providing network access to one or more devices, according to some embodiments.

FIG. 1 illustrates an example system 100 for providing data communication to user devices 102. The system 100 can be managed by internet service providers (ISPs) and receive network access from network service providers (NSPs). ISPs can be any type of business or organization that provides services for accessing, using, or participating in the Internet. NSPs can be any business or organization that sells bandwidth or network access by the Internet backbone to ISPs. The system 100 can provide various types of networks/telecommunications. For example, the system 100 can provide a 5G network.

The system 100 can include one or more access layers 106 and optionally one or more aggregation layers 108 and a core layer 110. The access layers 106 can be in communication with central unit ("5G CU") (not illustrated), distributed units 112 ("5G DU"), and/or small cells 114 ("5G Small Cells"). The central unit includes gnB functions (e.g., transfer of user data, mobility control, radio access network sharing, and positioning, and session management) and controls the distributed units 112. The distributed units 112 include a subset of the gNB functions depending on the functional split between the central unit and distributed units 112. The small units 114 are radio access points with low radio frequency and low range and are small, unobtrusive, and easy to be deployed near the user devices 102.

As will be discussed in more detail below, the access layers 106 can provide communication to the distributed units 112 and/or the small cells 114 at or near the access layers 106's edge. Moreover, although not illustrated, where the aggregation layer 108 and the core layer 110 are not utilized, the access layers 106 can be in communication with the external network components 116 to provide communication to the distributed units 112 and/or the small cells 114. The distributed units 112 and/or the small cells 114 can be in communication with the user devices 102. The user devices 102 can be any type of computing device able to communicate with the distribution units 112 or the small cells 114. The user devices 102 can include a portable communication device. The user devices 102 can be associated with a user and can be located on and/or as part of a vehicle and/or a company (e.g., a hospital).

The number of access layers 106 utilized can depend on the size of the environment or setting. For example, in small deployments (e.g., a workplace) or medium deployments (e.g., a university), a single access layer 106 can be utilized. However, in large deployments (e.g., a city), multiple access layers 106 can be utilized for different geographical regions. In such a scenario, each access layer 106 can be in communication with each other. This can allow the system 100 to more effectively serve the user devices 102, such as with improved latency and more efficient bandwidth utilization.

The aggregation layers 108 can be utilized when the access layers 106 are deployed in different geographical regions (e.g., cities, states, and/or local/national regions). A single aggregation layer 108 can support multiple access layers 106. Thus, the single aggregation layer 108 can be in communication with multiple access layers 106 at the same or different times. In some embodiments, multiple aggregation layers 108 can each be in communication with multiple access layers 106 at the same or different times. In doing so, the aggregation layers 108 can provide and/or receive services to the access layers 106 at or near access layers 106's edge, as will be discussed in more detail below. The aggregation layer 108 can be utilized in a large-scale setting (e.g., a city), not in a medium-scale setting (e.g., a university) or a small-scale setting (e.g., a building), according to some embodiments.

When the aggregation layer 108 is utilized, the aggregation layer 108 can be between, and in communication with, the access layer 106 and the core layer 110. In this configuration, the access layer 106 and the core layer 110 are not in communication with each other, in some embodiments. Alternatively, when the core layer 110 is not utilized, the access layer 106 can be in communication with the external network 124. When the aggregation layer 108 is not utilized, the access layer 106 can be in communication with the core layer 110, which can be in communication with the external network 124, according to some embodiments. In some embodiments, external network 124 is a digital telecom network operator.

Moreover, the core layer 110 can be utilized depending on the preference of the ISPs. For instance, where multiple access layers 106 and/or aggregation layers 108 are deployed, the core layer 110 can also be deployed. Alternatively, when a single access layer 106 and/or aggregation layer 108 is deployed, the core layer 110 can still be deployed. Accordingly, when the core layer 110 is deployed, the core layer 110 can be in communication with each aggregation layer 108. Thus, the core layer 110 can serve as a central location for communicating with the aggregation layers 108. In doing so, the core layer 110 can be in communication with the external networks 124.

The access layers 106, the aggregation layers 108, and the core layer 110 can each have network components 116 with defined functions. For example, the network components 116 can have an internet protocol security function ("IP Sec"), a central computing function for the network ("5G CU"), a unified power format ("UPF"), a user data management function ("UDM"), and a common power format ("CPF"), any other network function ("other NFs") functions, or a combination thereof. Moreover, although not illustrated, the network components 116 can be situated outside of the access layers 106, the aggregation layers 108, and the core layer 108. For example, although not illustrated, the network components 116 can include the distribution units 112 and/or small cells 114. Likewise, the network components 116 can also include routers (not shown) and/or other devices assisting the network.

The access layers 106 and the aggregation layers 108 can have one or more network components 116 at or near its edge ("edge network components") for providing telecommunication. Accordingly, since the aggregation layers 108 can each support multiple access layers 106 as discussed above, the edge network components of the aggregation layers 108 can provide telecommunication to the edge network components of the access layers 106. Moreover, the edge network components of the access layers 106 and/or the aggregation layers 108 can be able to perform multi-access edge computing (MEC). MEC enables cloud computing at an edge of a network by running applications and performing related processing tasks closer to users of the network, thereby reducing network congestion and allowing user applications to perform more efficiently.

Further, the access layers 106 and the aggregation layers 108 can have multiple edge network components (e.g., capable of performing MEC) depending on a number of the user devices 102, a type of application run by user devices 102, a location of the user devices 102, a bandwidth utilization of the user devices 102, and/or a latency experienced by the user devices 102, to provide a few examples. The access layers 106 and aggregation layers 108 can have edge network components designated for certain activities of the user devices 102. For example, if a number of the user devices 102 is extensively using a specific application (e.g., a social media application), the access layers 106 and the aggregation layers 108 can have edge network components exclusively for supporting the specific applications. The access layers 106 and the aggregation layers 108 can have multiple network components 116 performing MEC located at or near the edge. By being at or near the edge, the network components 116 can operate at or near the source of the data source, instead of relying on the cloud to analyze the data packets of the network components 116, and can thus perform edge computing. In doing so, the network components 116 can bring computation and data storage closer to the data source, save bandwidth, and improve response times (e.g., among the user devices 102 and from the network components 116 to third-party components 118, 120, and 120).

The access layers 106, the aggregation layers 108, and the core layer 110 can be adapted to receive the third-party components 118, 120, and 122. The third-party components 118, 120, and 122 can be in communication with and/or configured to operate in conjunction with the designated network components 116. For example, as shown in FIG. 1, the access layers 106 and the aggregation layers 108 can have third-party components 118 and 120 at or near its edge. Like the network components 116, the third-party components 118 and 120 can be adjacent to the edge network components 116 of the access layers 106 and the aggregation layers 108. Although not shown in FIG. 1, the third-party components 118, 120, and 122 can also be standalone components, which can operate with other network components 116 and/or third-party components 118, 120, and 122.

Further, the third-party components 118, 120, and 122 can be in communication with the edge network components (not illustrated) of the access layers 106 and the aggregation layers 108. The third-party components 118, 120, and 122 and the edge network components can also be MEC components. The third-party components 118 and 120 of the access layers 106 and the aggregation layers 108 can be in communication with each other in a similar fashion as the edge network components of the access layers 106 and the aggregation layers 108 as discussed above.

Moreover, as illustrated in FIG. 1, the core layer 110 can have a third-party component 122 at or near its center. Accordingly, the third-party components 118 and 120, alone or together with the third-party component 122 of the core layer 110, can provide network and/or application-level visibility, as well as insights and/or predictions, of the user devices 102 and/or the network, as will be discussed in more detail below. In doing so, the third-party components 118, 120, and 122 can permit monitoring of the network and/or acquiring actionable intelligence on user experience in the network. The third-party components 118, 120, and 122 can also have an engine providing network exposure function ("NEF") and/or network data analytical function ("NWDAF").

In some embodiments, the number of third-party components 118, 120, and 122 can depend on the number of network components 116 or, as will be discussed in more detail below, the number and/or type of network actions, characteristics, and/or analytics to be performed. In some embodiments, the third-party components 118, 120, and 122 can support each network component 116. Each third-party component 118, 120, and 122 can be in communication with each network component 116 and can be programmed to determine specific analytics and/or specific corrective/preventive network actions. In some embodiments, the number of third-party components 118, 120, and 122 can depend on the congestion in the network. For example, although not illustrated, if the network has high congestion, additional third-party components 118, 120, and 122 can be included in the network to timely provide analytics and/or corrective/preventive network actions.

The third-party components 118, 120, and 122 can also be dynamic and perform various analytical functions for the network. For example, the third-party components 118, 120, and 122 can perform multiple analytical functions (e.g., predicting and clustering) for specific characteristics (e.g., a geographical location of users) of the network. In some embodiments, the third-party components 118, 120, and 122 can perform multiple analytical functions for particular characteristics (e.g., a geographical location of users and an application utilized by the user devices 102) of the network.

The third-party components 118, 120, and 122 can be in communication with each other. Upon receipt of pertinent data, the third-party components 118, 120, and 122 can forward the data to specific third-party components 118, 120, and 122 for performing their respective functions of characteristics on the network. This can allow one or more third-party components 118, 120, and 122 to interact with the network (e.g., network components), thus allowing the third-party components 118, 120, and 122 and/or network to operate more efficiently.

Figure 2:
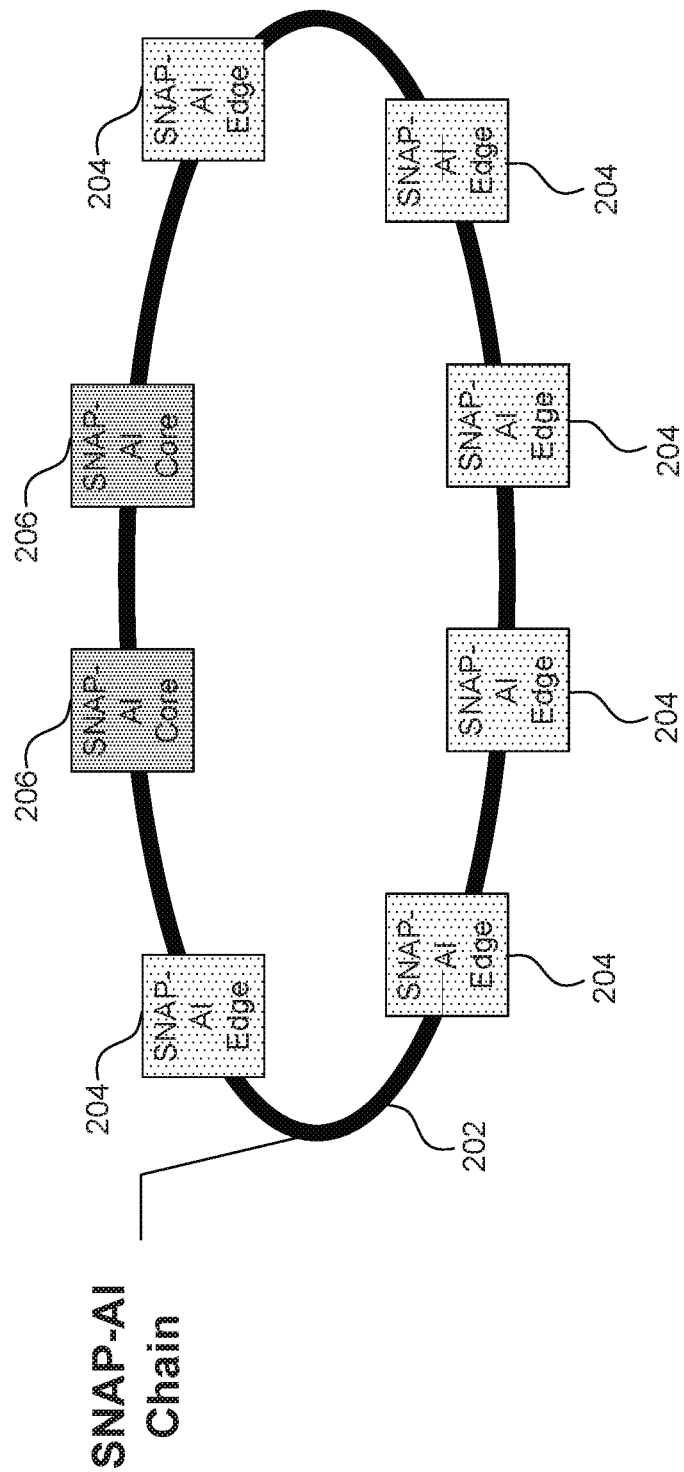
FIG. 2 illustrates a chain connecting third-party components, according to some embodiments.

FIG. 2 illustrates a third-party chain 202 binding multiple third-party components 204 and 206. The third-party components 204 can reside at or near an edge of the access layers 106 and optionally the aggregation layer 108 (both illustrated in FIG. 1). The third-party components 206 can also optionally reside at or near the center of core layers 110 (illustrated in FIG. 1). The third-party chain 202 can be deployed when multiple third-party components 204 are being utilized on the access layers 106, aggregations layers 108, and/or core layer 110, according to some embodiments. The third-party chain 202 permits communication between the third-party components 204 and 206.

The third-party components 204 and 206 can provide network and/or application-level visibility, as well as insights and/or predictions of the user devices 102 (illustrated in FIG. 1) and/or the network. In some embodiments, the third-party chain 202 can permit the third-party components 204 and 206 to send and/or retrieve some or all of the copies of data packets received from the network components 116 (illustrated in FIG. 1). The third-party chain 202 can also permit a network operator to retrieve some or all of the copies of data packets that the third-party components 204 and 206 receive from the network components 116. The third-party chain 202 can enable continuous validation, correlation, artificial intelligence-driven prediction, and/or classification of performance insights including, for example, user, user device, application, network power (e.g., next-generation nodeB (gNB) and evolved nodeB (eNB)), distribution units (DU), small cell, specified areas, and network component interface.

Figure 3:
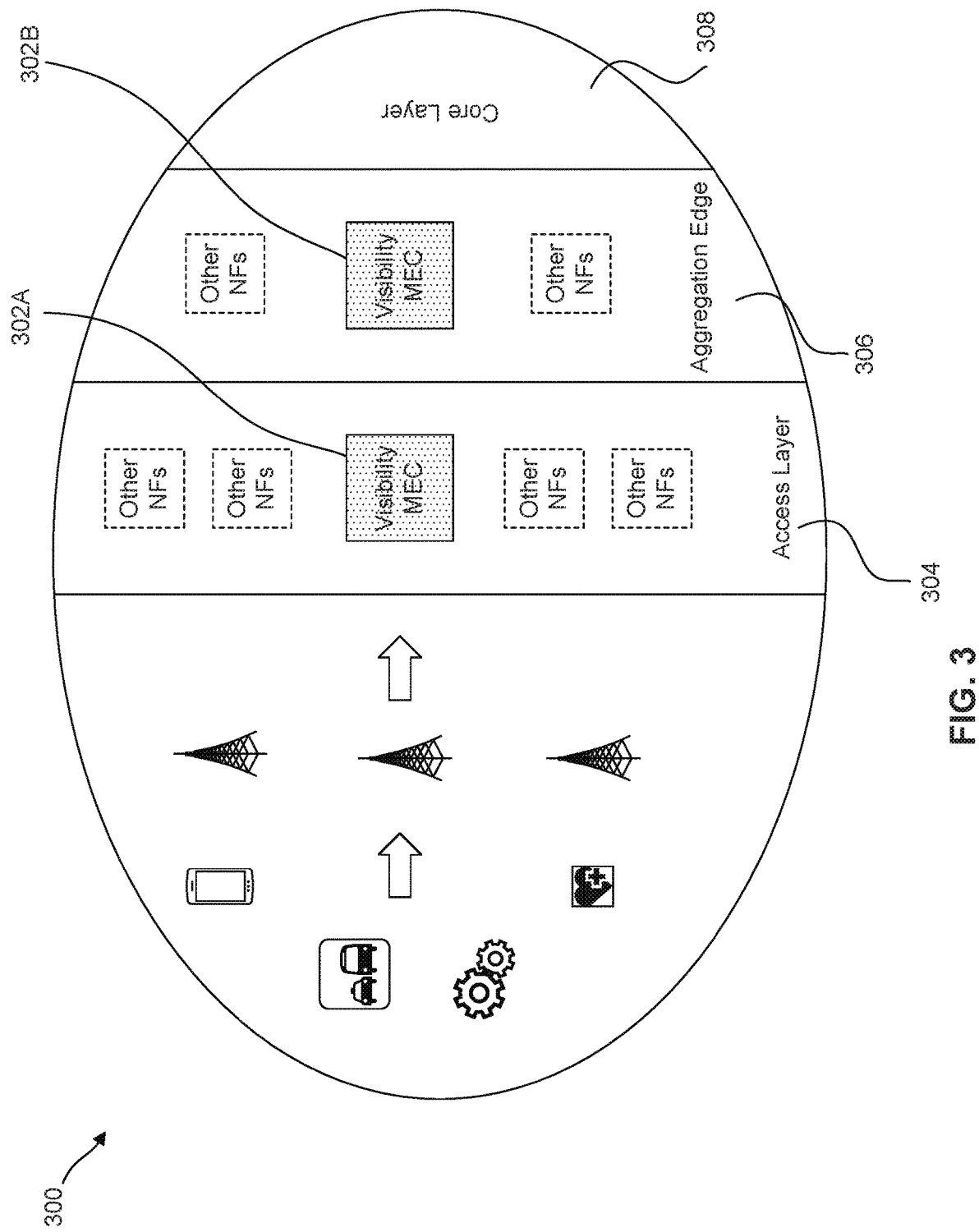
FIG. 3 illustrates an edge layer and an aggregated edge layer including a third-party component, according to some embodiments.

FIG. 3 illustrates third-party components 302A-B connected to a core network 300, according to some embodiments. The core network 300 includes an access layer 304, an aggregation layer 306, and/or a core layer 308. The access layer 304, the aggregation layer 306, and the core layer 308 can include the third-party components 302A-B and network components 308A-F. The third-party components 302A-B can be located at or near an edge of the access layer 304, the aggregation layer 306, and/or the core layer 308. The third-party components 302A-B can be surrounded by the network components 308A-F. In some embodiments, the third-party network components 302A-B can perform multi-access edge computing (MEC).

Referring to FIG. 1, the network components 116 (e.g., cell towers) can be programmed to send copies of data packets received from the user devices 102 to the third-party components 118, 120, and 122. The copies of data packets can be sent on a regular interval (e.g., hourly, daily, etc.). The copies of the data packets can also be sent based on an amount of congestion in the network exceeding predefined thresholds. For example, if the amount of network congestion meets or exceeds a first predefined threshold (e.g., 60% congestion), copies of data packets can be sent to the third-party components 118, 120, and 122. And if the amount of network congestion meets or exceeds a second predefined threshold that is greater than the first predefined threshold (e.g., 60% congestion), copies of the data packets can be sent to the third-party components 118, 120, and 122. The third-party components 118, 120, and 122 can receive the data packets in real-time and continually analyze the copies of the data packets to, for example, continually permit timely analytics and/or provide corrective/preventive network actions. The third-party components 118, 120, and 122 can decrypt any encrypted data packets sent from the user devices 102 and/or forwarded by the network components 116.

Upon receipt of the copied data packets, the third-party components 118, 120, and 122 can decode and parse through the copied data packets. The data packet includes a header, a payload (also called a body), and a trailer. The header includes a plurality of unique identifiers at predefined positions, such as a source IP address, a destination IP address, a source port number, a destination port number, and a protocol identification number, to provide a few examples. The third-party components 118, 120, and 122 can extract the header's unique identifiers. The third-party components 118, 120, and 122 can also derive data based on the header's unique identifiers. Data that can be extracted and/or derived based on the header's unique identifiers include a bandwidth allocated to a particular user, a bandwidth utilized by a particular user, an application used by a particular user, a latency of a network component, a number of users in a given location, and/or network congestion for a given location, to provide a few examples.

In some embodiments, the third-party components 118, 120, and 122 can perform a deep packet inspection of the data packet's header and/or payload to derive associated metadata. Based on the metadata, the third-party components 118, 120, and 122 can derive characteristics from the data packet or flow of data packets. The characteristics related to a particular data packet and a flow of data packets can include a user location, a user device type, an amount of throughput, a direction of flow, a bandwidth utilization, a latency, a utilized network service, an IP address, and a utilized transport mechanism, to provide a few examples. The characteristics related to a traffic flow of packets can further include a number of users, a number of packets flowing in each direction, a number of utilized network services, a number of utilized transport mechanisms, and a number and type of anomalies, an average length of session per user, a pattern per user, and an average throughput per user, to provide a few more examples. In some embodiments, by receiving copies of data packets received by the network components 116 on or near the edge of the network, the third-party components 118, 120, and 122 can derive characteristics that would not have otherwise been readily determined. For example, the third-party components 118, 120, and 122 can determine the strength of radio signals for particular users or user devices 102 and a variation of radio interference signals during user mobility events, to provide a few examples. Thus, the third-party components 118, 120, and 122 can provide more detailed application-level information and/or custom-pattern information.

In some embodiments, the third-party components 118, 120, and 122 can act in accordance with one or more network policies. In some embodiments, the network provider policies can relate to accessing received network packets, communicating with other third-party components 118, 120, and 122, analyzing data of network packets (e.g., deriving metadata and/or characteristics), and storing analyzed data. In some embodiments, the network provider policies can relate maintaining a network provided in a geographical region. In some embodiments, network provider policies can instruct the third-party components 118, 120, 112 to perform actions relating to application scaling, cost optimization, and/or corrective/preventive actions. Application scaling can relate to an application quality of service, upload or downlink application speed, and/or a user response time, in some embodiments. Application scaling can relate to a specific application in a particular geographical region or a group of applications in a particular geographical region. Cost optimization can relate to required computing resources, memory resources, and/or memory resources for maintaining end-user experience. Corrective/preventive actions can relate to a network specified response to an unforeseen event, such as a network connection failure or decrease in response time, an unexpected increase in a number of applications, and/or an unexpected increase in number of users, to provide a few examples. For example, after determining that the data rate and throughput for a particular geographical meets or exceeds a defined threshold, the network provider policies can instruct the third-party components 118, 120, and 122 to perform a corrective or preventive action to maintain the network without user interruption, such as creating an application instance, in some embodiments.

Figure 4:
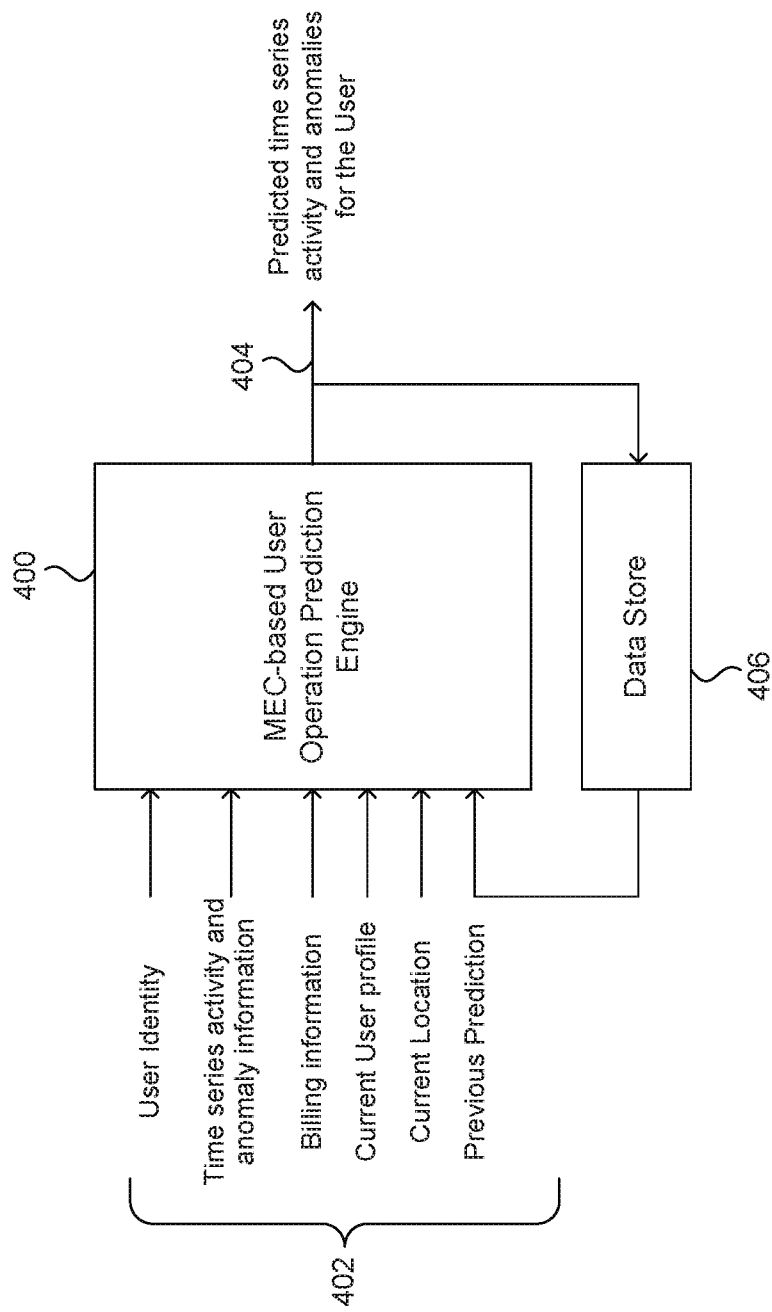
FIGS. 4-7 illustrate prediction engines utilized by a third-party component, a host, and an entity for predicting various characteristics of a network, according to some embodiments.
Figure 5:
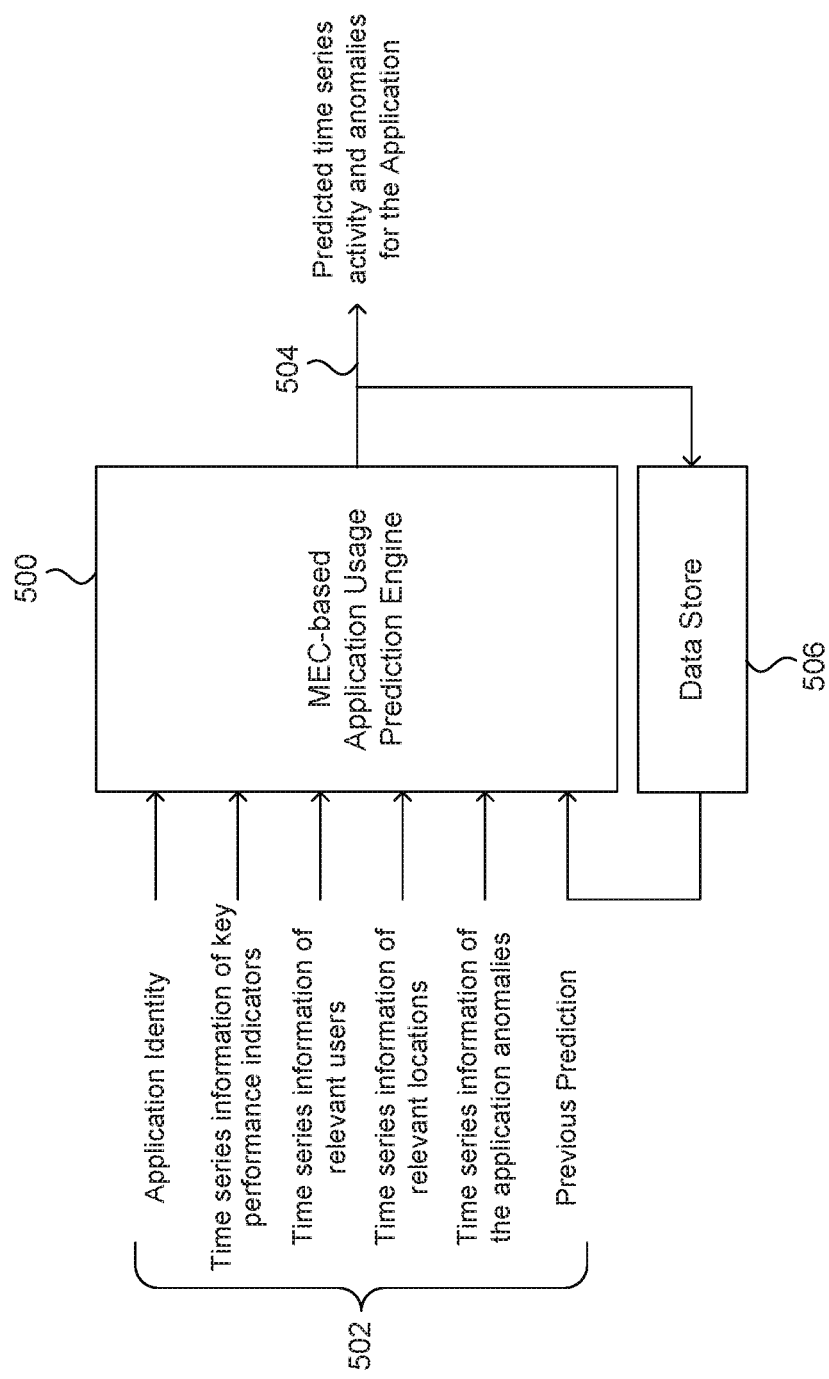
Figure 6:
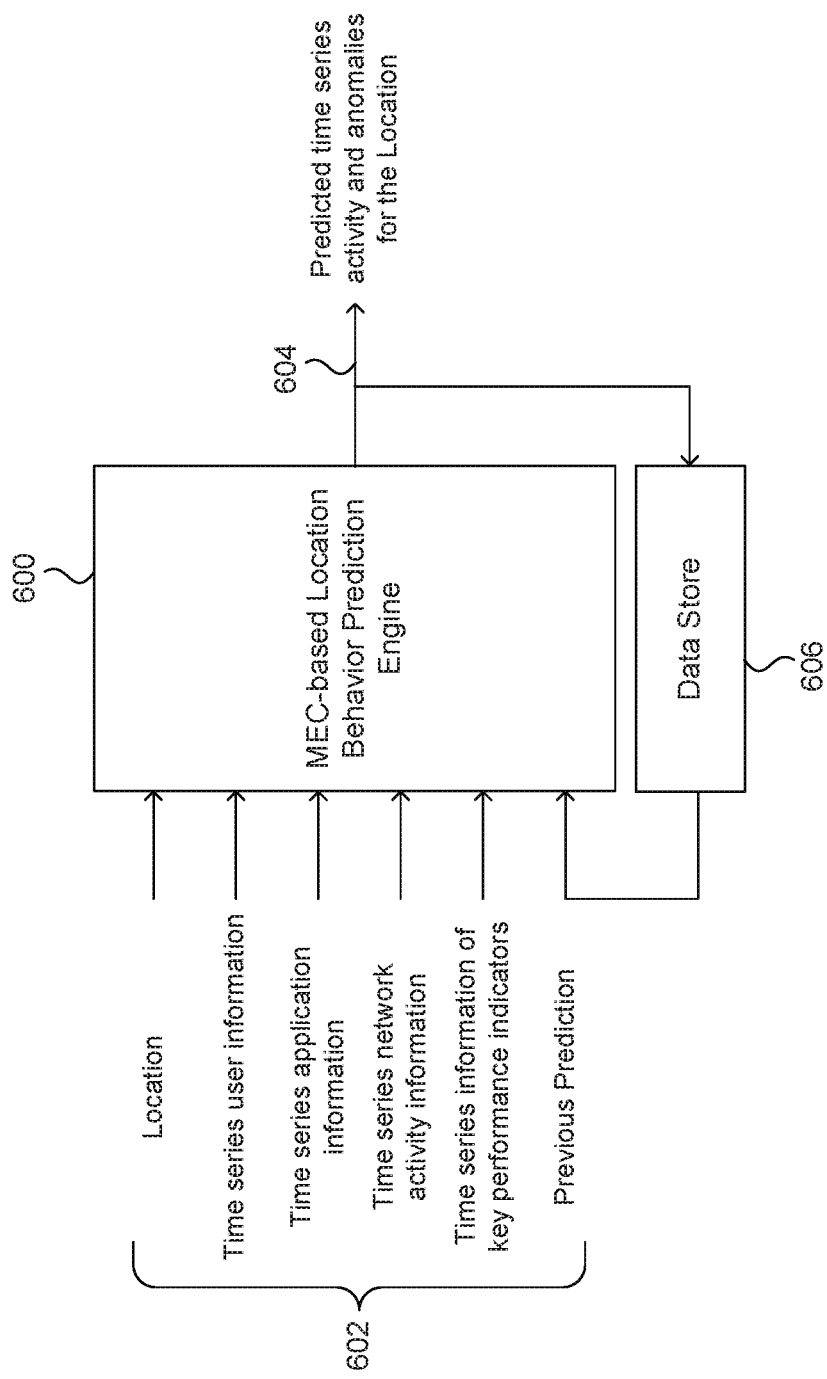
Figure 7:
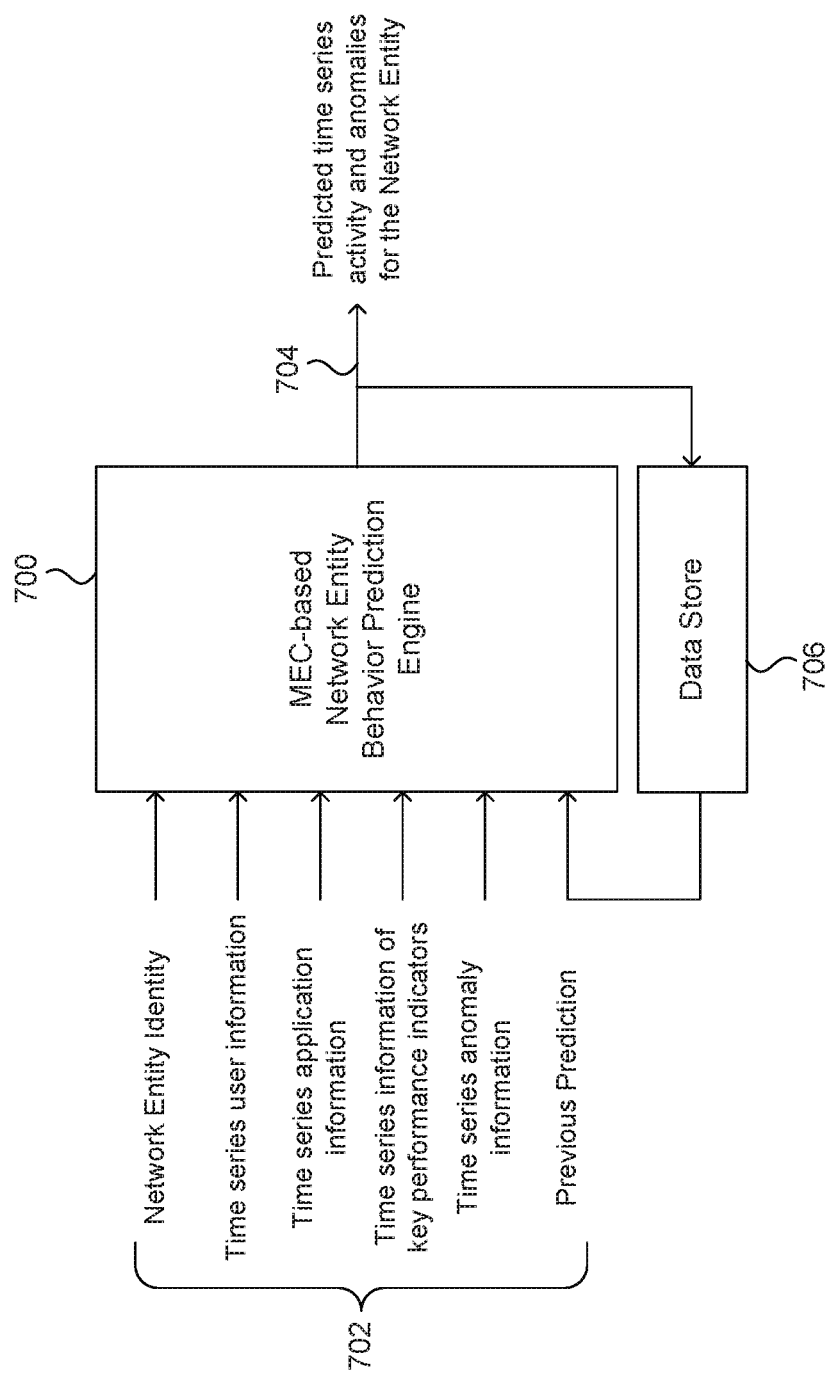

FIGS. 4-7 illustrate various types of prediction engines 400, 500, 600, and 700 utilized by the third-party components 118, 120, and 122 (of FIG. 1) for predicting particular characteristics in a network for a desired period of time, according to some embodiments. In some embodiments, the desired period of time can be provided by the network provider, for example, via an application provided to user devices 102 of FIG. 1. FIG. 4 illustrates a user-operation prediction engine 400 for predicting future operations of users in the network. FIG. 5 illustrates an application-usage prediction engine 500 for predicting future usage of specific types of applications. FIG. 6 illustrates a location-behavior prediction engine 600 for predicting data usage for particular times and/or locations (e.g., 7:00 AM-5:00 PM in office buildings) in the network, the type applications used at specific locations (e.g., social media application on campuses) in the network, or any other network characteristic described above at particular locations in the network. FIG. 7 illustrates a network-entity behavior prediction engine 700 for predicting future user behavior of a specific location in the network.

Referring to FIGS. 4-7, the user-operation prediction engine 400, the application-usage prediction engine 500, the location-behavior prediction engine 600, and the network-entity behavior prediction engine 700 can receive a respective number of inputs 402, 502, 602, and 702, which can be from different sources. For example, the inputs 402, 502, 602, and 702 can be from data extracted from the received data packets, data provided by the network providers, data received/determined from other third parties or network components, and/or the outcome of the prediction engine, as will be described below.

Referring to FIG. 4, the user-operation prediction engine 400's inputs 402 can include a user identity, time-series activity, anomaly information, billing information, current user profile, current location, and/or previous predictions. The user identity can be for a single user or a group of users. The user identity can be a subscription permanent identifier (SUPI), a permanent equipment identifier (PEI), a mobile station international subscriber directory number (MSISDN), and/or a generic public subscription identifier (GPSI).

Referring to FIG. 5, the application-usage prediction engine 500's inputs 502 can include an application identity, time-series information of key performance indicators (KPIs), time-series information of relevant users, time-series information of relevant locations, time-series information of the application anomalies, and/or previous predictions. The KPIs can include latency, throughput, and volume of data consumed. The time-series information of relevant users can relate to those who assessed the application and can include groups and unique identity. The time-series information of the relevant locations and the relevant application anomalies can be from which the application was assessed.

Referring to FIG. 6, the location-behavior prediction engine 600's inputs 602 can include a location, time series user information, time-series network activity information, time-series information of KPIs, and/or previous predictions. The time series user information can be user density, user groups or types, device types, and/or unique user identity. The times series application information can relate to the specific location monitored. The times series network information can be for a particular network component dedicated to the specific location (e.g., a radio tower and a network edge). The time-series information of KPIs can include latency, the volume of the data consumed, and/or throughput utilization.

Referring to FIG. 7, the network-entity behavior prediction engine 700's inputs 702 can include a network entity identity or group identifier, time-series user information, time-series application information, time-series information of KPIs, time-series anomaly information, and/or previous predictions. The time-series user information can include user density, user groups or types, device types, and/or unique user identity. The time-series application information can be accessed through the network entity. The time-series information of KPIs can include latency, the volume of data consumed, and/or throughput utilization. The time-series anomaly information can include a history of anomalies on the network entity.

Referring to FIGS. 4-7, based on the inputs 402, 502, 602, and 702, the user operation prediction engine 400, the application usage prediction engine 500, the location behavior prediction engine 600, and the network-entity behavior prediction engine 700 can respectively provide unique outputs 404, 504, 604, and 704. The outputs 404, 504, 604, and 704 can provide predicted time series activity. For example, the user-operation prediction engine 400's output 404 and the application-usage prediction engine 500's outputs 504 can provide activities and/or anomalies for user operation and a user application usage over a specified time in the future, respectively. The location-behavior prediction engine 600's output 604 can provide a behavior pattern at a geographical location (e.g., estimated KPI, user groups, and anomalies) for a given time period in the future. The network-entity behavior prediction engine 700's output 704 can provide an exact behavior by the network components 116 (of FIG. 1) over a period of time in the future. The predicted time series activity of the outputs 404, 504, 604, and 704 can include predicted future anomalies.

Further, the user-operation prediction engine 400, the application-usage prediction engine 500, the location-behavior prediction engine 600, and the network-entity behavior prediction engine 700 can store outputs 404, 504, 604, and 704 for a given period of time in a database 406, 506, 606, and 706, respectively. The user-operation prediction engine 400, the application-usage prediction engine 500, the location-behavior prediction engine 600, and the network-entity behavior prediction engine 700 can then provide the outputs 404, 504, 604, and 704 as an input to a deep learning 804 (of FIG. 8) when analyzing the given period of time. This can allow the user-operation prediction engine 400, the application-usage prediction engine 500, the-location behavior prediction engine 600, and/or the network-entity behavior prediction engine 700 to more accurately predict the respective outputs 404, 504, 604, and 704 over a period of time in the future.

Figure 8:
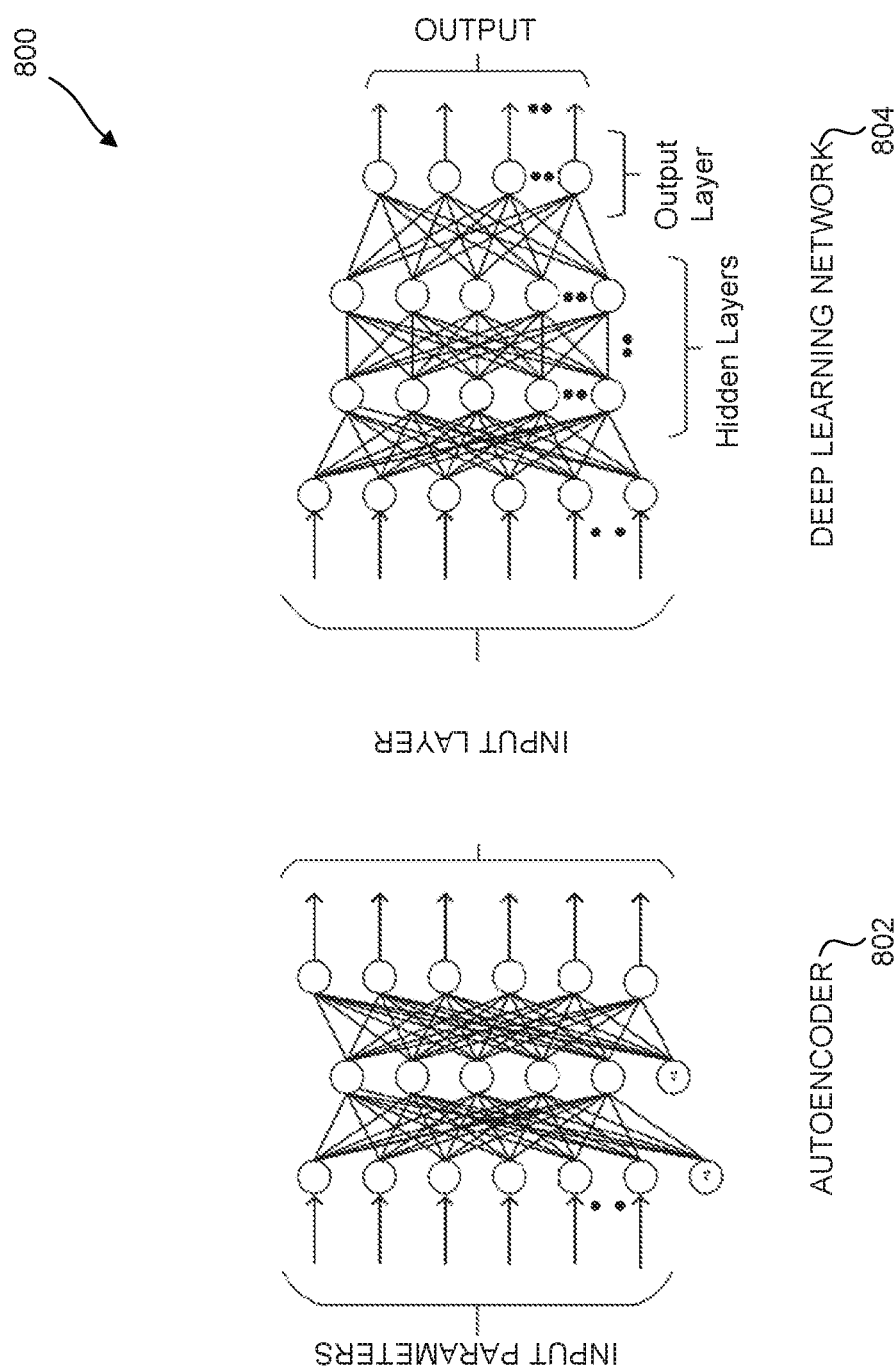
FIG. 8 illustrates an autoencoder-deep learning network configuration utilized by a prediction engine, according to some embodiments.

FIG. 8 illustrates an autoencoder-deep learning network configuration 800 utilized by prediction engines 400, 500, 600, and 700 (of FIGS. 4-7), according to some embodiments. The autoencoder-deep learning network configuration 800 can include the autoencoder 802 and the deep learning network 804. The autoencoder 802 can receive inputs over a specified period of time (e.g., 1 hour, 1 week, 1 month, and 1 year). As described above, the prediction engines 400, 500, 600, and 700 (of FIGS. 4-7) may receive different inputs. The autoencoder 802 utilized by the user-operation prediction engine 400 can receive inputs relating to user identity, time-series activity and anomaly information, billing information, current user profile, current location, and/or previous predictions. The autoencoder 802 utilized by the application-usage prediction engine 500 can receive inputs relating to application identity, time series of KPIs, other relevant information, other relevant users, application anomalies, and/or previous predictions. The autoencoder 802 utilized by the location-behavior prediction engine 600 can receive inputs relating to a location, time series user information, time-series network activity information, time-series information of KPIs, and/or previous predictions. The autoencoder 802 utilized by the network-entity behavior prediction engine 700 can receive inputs relating to network entity identity or group identifier, time-series user information, time-series application information, time-series information of KPIs, time-series anomaly information, and/or previous predictions.

In some embodiments, the autoencoder 802 can be trained to determine a representative data (e.g., compressed data) using designated algorithms based on the respective inputs of the prediction engines 400, 500, 600, and 700 (of FIGS. 4-7). In doing so, the autoencoder 802 can filter out unneeded or unrepresentative data and retain applicable information based on, for example, previous predictions. In some embodiments, the amount of representative data can be less than the amount of input data.

The autoencoder 802 provides the representative data as input to the deep learning network 804. The deep learning network 804 can include a number of hidden layers. For example, in some embodiments, the deep learning network 804 can include 16 hidden layers. The number of neurons can vary across the hidden layers. Each neuron receives input from the autoencoder 802 can derive a part of the outcome ultimately provided by the deep learning network 804. The deep learning network 804 can predict the activity for a desired period of time in the future. In doing so, the deep learning network 804 can also predict expected anomalies during the desired period of time. In some embodiments, the autoencoder 802 may be a variational autoencoder. In some embodiments, the deep learning network 804 may be a deep belief network and a neural network, to provide a few examples.

Referring to FIG. 1, as described above, the third-party components 118, 120, and 122 can cluster the characteristics of data packets (e.g., user's identification, applications, network entities, and locations) into a number of groups (e.g., 2, 3, 5, and 10). In some embodiments, the third-party components 118, 120, and 122 can use a neural network-based mechanism that transforms the various characteristics of a data packet into a latent representation of the data packets. Example neural network-based mechanisms include a deep learning network, a multilayer perceptron, a deep belief network, a convolutional neural network, a variational autoencoder, and a generative adversarial network, to provide a few examples. Accordingly, for example, the third-party components 118, 120, and 122 can provide a latent representation relating to a user device 102's application usage behavior based on locations and/or mobility patterns.

Figure 9:
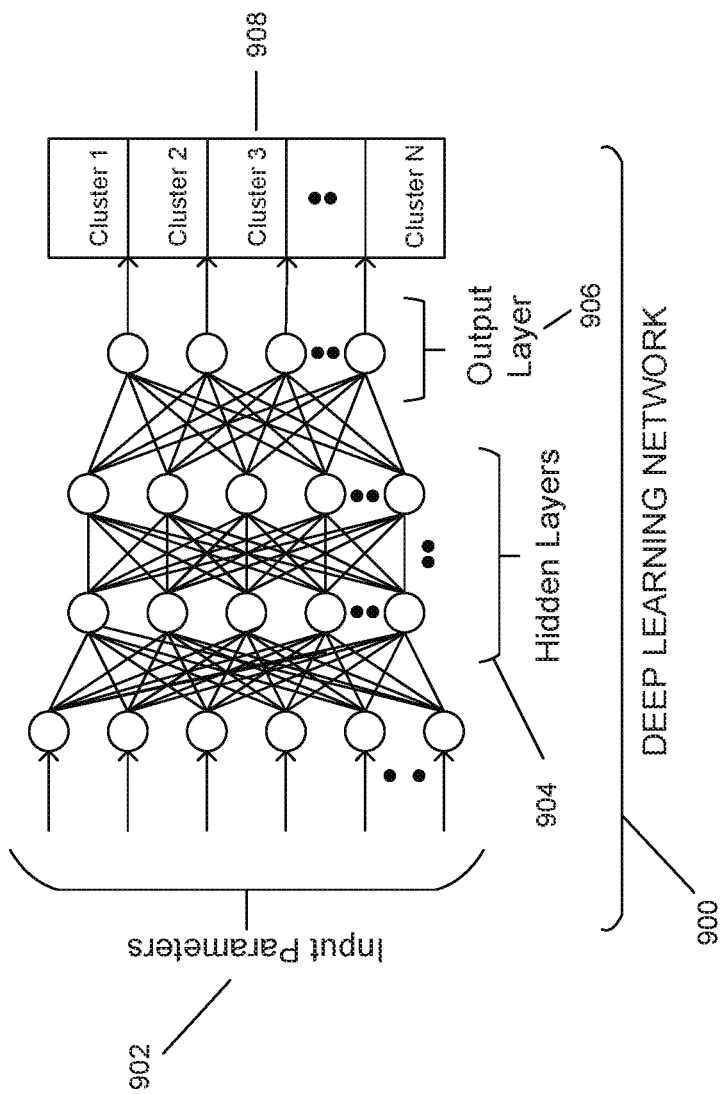
FIG. 9 illustrates a deep learning network utilized by a prediction engine, according to some embodiments.

After determining the latent representation, the third-party components 118, 120, and 122 can use a deep learning network for clustering the data packets. In some embodiments, the third-party components 118, 120, and 122 can perform classification based on characteristics selected by the network provider, for example, in an application provided to user devices 102. FIG. 9 illustrates an example of a deep learning network 900 that can receive inputs 902 of various latent representations of particular characteristics relating to a user, geographical location, and/or entity. For example, as stated above, the latent representation can relate to a user device's application usage behavior based on locations and/or mobility patterns. As explained above, with respect to FIG. 8, the deep learning network 900 can identify a predetermined number of hidden layers 904. For example, in some embodiments, the predetermined number of hidden layers 904 can be 16. The deep learning network 900 can then derive outputs 906 corresponding to associated clusters 908. In some embodiments, the data packets can be grouped based on a user's behavioral aspects as specified in the derived characteristics (e.g., subscribers, applications, network entities, and locations). Behavioral aspects for users can include application usage, the volume of data consumed, and mobility behavior, to provide a few examples. Behavioral aspects for applications can include the type of data (e.g., video), a predefined throughput requirement, and average latency, to provide a few examples. Behavioral aspects for network entities can include network capacity, average load, user density, and anomaly characteristics. Behavioral aspects for geographical locations can include user density, anomaly characteristics, and most-used application types, to provide a few examples.

Figure 10:
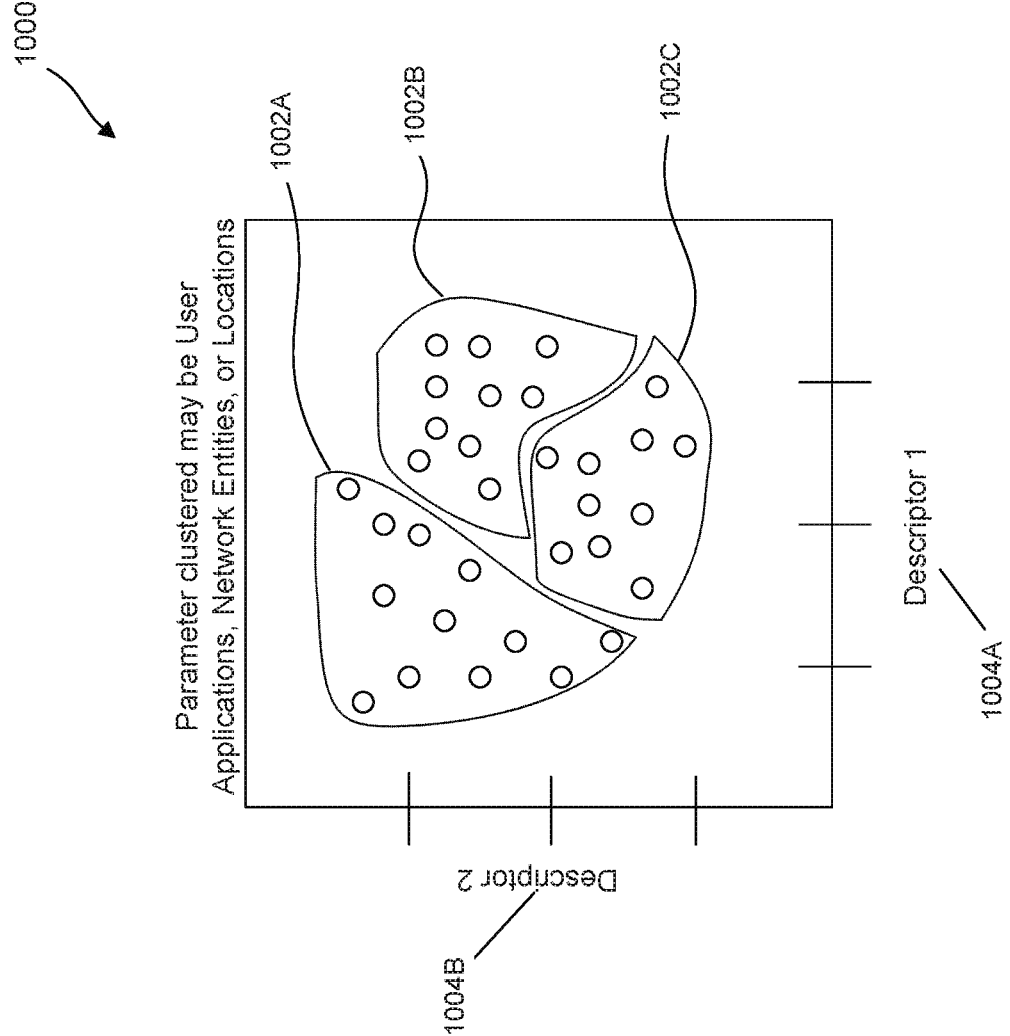
FIGS. 10 and 11 illustrate a data clustering performed by a third-party component, a host, and an entity, according to some embodiments

FIG. 10 illustrates an example clustering 1000 of packets performed by the third-party components 118, 120, and 122 (of FIG. 1) for a particular characteristic (e.g., user's identification, applications, network entities, and/or locations). For example, the third-party components 118, 120, and 122 can determine that the packets are to be grouped into three separate groups 1002A-C. The three separate groups 1002A-C can be defined by one or more parameters 1004A-B of the characteristic. As described above, parameters of subscribers can relate to data used to monitor application usage, the volume of data consumed, and mobility behavior. Parameters of applications can relate to data used to monitor a data type, a throughput requirement, and an average latency. Parameters of network entities can relate to data used to monitor capacity, average load, subscriber density, and/or anomaly characteristics. Parameters of locations can relate to data used to monitor subscriber density, anomaly characteristics, and/or most-used application dates. In some embodiments, the third-party components 118, 120, and 122 determine that there are three separate groups 1002A-C based on application usage and location. The groups 1002A-C can be defined (or illustrated) based on a first parameter (e.g., location) 1004A and a second parameter (e.g., application usage) 1004B.

Referring to FIG. 1, the third-party components 118, 120, and 122 can classify data packets into a number of groups (e.g., 2, 3, 5, and 10) based on derived characteristics (e.g., user identification, application, network entities, and locations). In some embodiments, the third-party components 118, 120, and 122 can perform classification based on characteristics selected by the network provider, for example, in an application provided to user devices 102. The third-party components 118, 120, and 122 can use a binary or multiclass classifier, which is based on classification algorithms implementing decision trees, support vector machine, naïve Bayes trees, k-nearest neighbor algorithm, and/or density-based spatial clustering of applications with noise. The users can be classified based on an associated identifier, a volume of data being transported, a roaming identification, and/or a specific device type. The applications can be classified based on known specific patterns. The network entities and locations can be classified as predefined labels based on specific characteristics.

Figure 11:
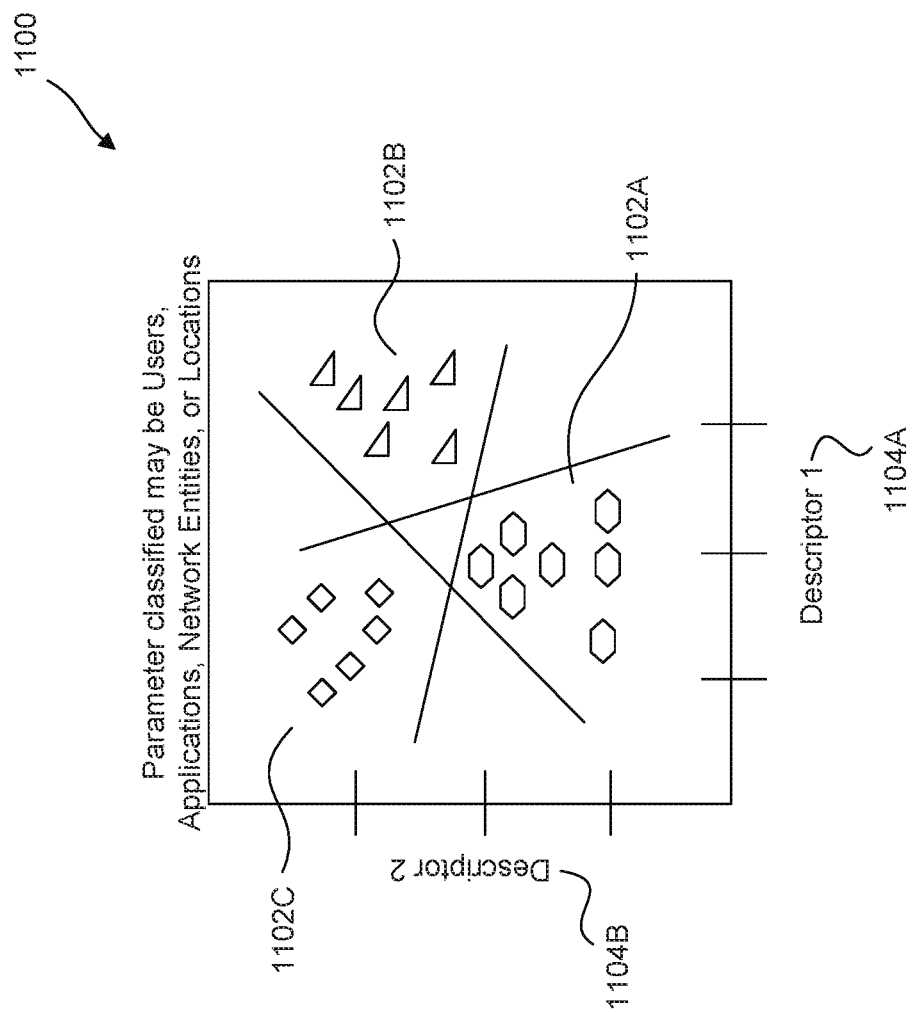

FIG. 11 illustrates an example classification 1100 of packets performed by the third-party components 118, 120, and 122 (of FIG. 1) for a particular characteristic (e.g., user's identification, applications, network entities, and locations). For example, the third-party components 118, 120, and 122 can determine that the packets are to be grouped into three separate groups 1102A-C. The three separate groups 1102A-C can be defined by one or more parameters 1104A-B of the characteristic. Groups 1102A-C and parameters 1104A-B are similar to group 1102A-C and parameters 1104A-B described above with respect to FIG. 10.

Referring to FIG. 1, as noted above, the third-party components 118, 120, and 122 may have predefined functions, which may be specified by a network provider. In some embodiments, the third-party component 118, 120, and 122's predefined functions can depend on the network packet's characteristics and/or metadata. In some embodiments, the predefined functions of the third-party components 118, 120, and 122 can be related to the end-user experience, application scaling, cost optimization, and/or corrective/preventive actions, to provide a few examples. The end-user experience can relate to a user quality service, a user observed error rate, an uplink or downlink speed, an average user bandwidth, and/or an average user throughput, in some embodiments. The end-user experience can relate to a specific user in a particular geographical region or a group of users in a particular geographical region. As described above, application scaling can relate to an application quality of service, upload or downlink application speed, and/or a user response time, in some embodiments. Cost optimization can relate to required computing resources, memory resources, and/or memory resources for maintaining end-user experience. Corrective/preventive actions can relate to a network specified response to an unforeseen event, Further, in some embodiments, one or more third-party components 118, 120, and 122 can have predefined functions relating to determining and/or aggregating characteristics over a period of time (e.g., 30 seconds, 5 minutes, and 30 minutes). In some embodiments, one or more of the third-party components 118, 120, and 122 can also perform analytical functions, for example, as described above with respect to FIGS. 4-11. For example, for a specific application utilized by the user devices 102, the third-party components 118, 120, and 122 can determine the number of users, a type of users, a location of users, an average number of users by device types, a user growth rate, a user retention rate, a user churn rate, an average length of session per user, an average session interval per user, a mobility patterns per user, an average radio strength of users, an average latency, a total throughput data, an average throughput data per user, a total bandwidth utilization, an average bandwidth utilization per user, a quality of service, types of detected errors, an error rate for each detected error, an average network response time, and/or an average request rate, to provide a few examples.

Figure 12:
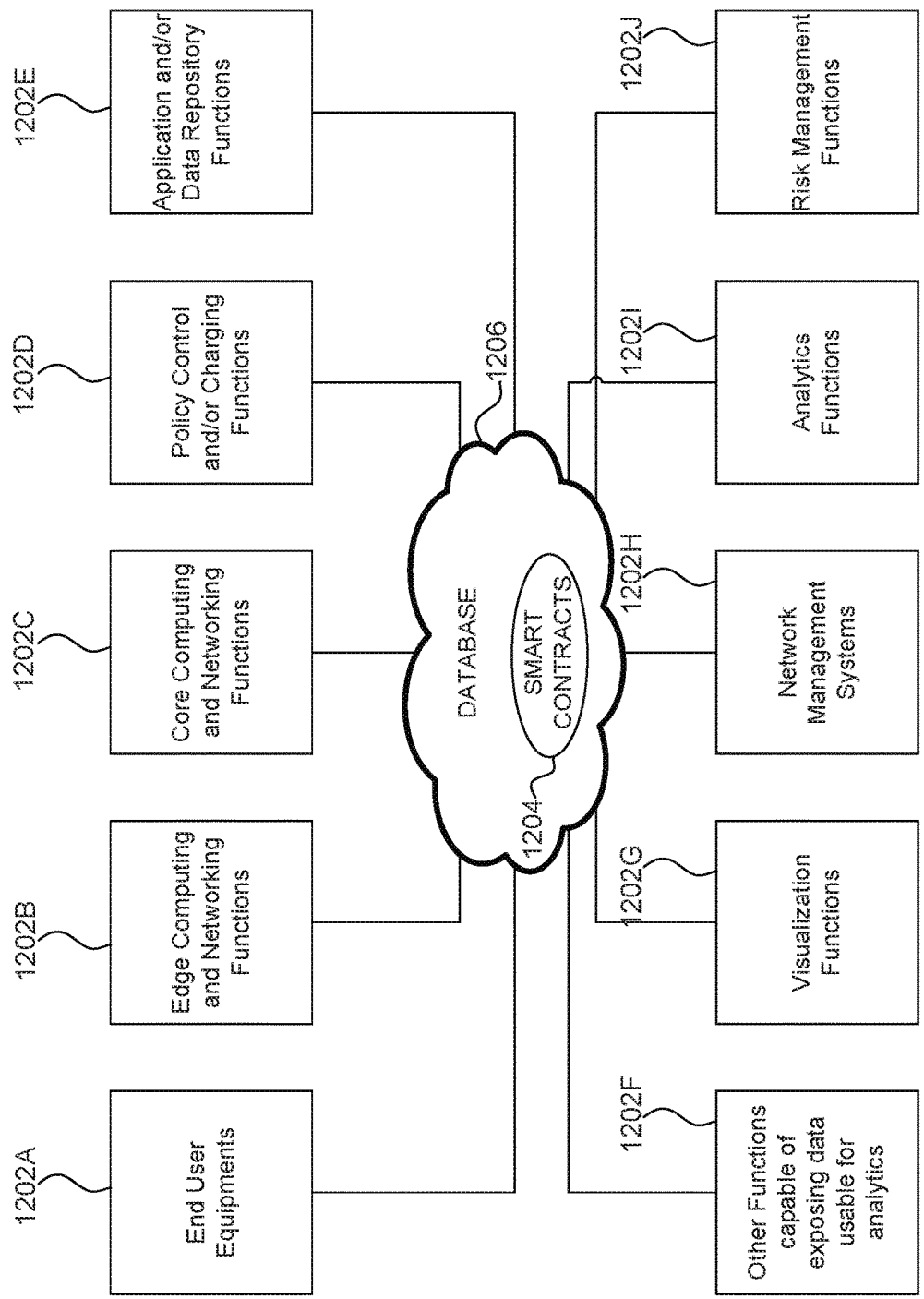
FIGS. 12 and 13 illustrate third-party components performing analytical functions using a distributed ledger in a network, according to some embodiments.
Figure 13:
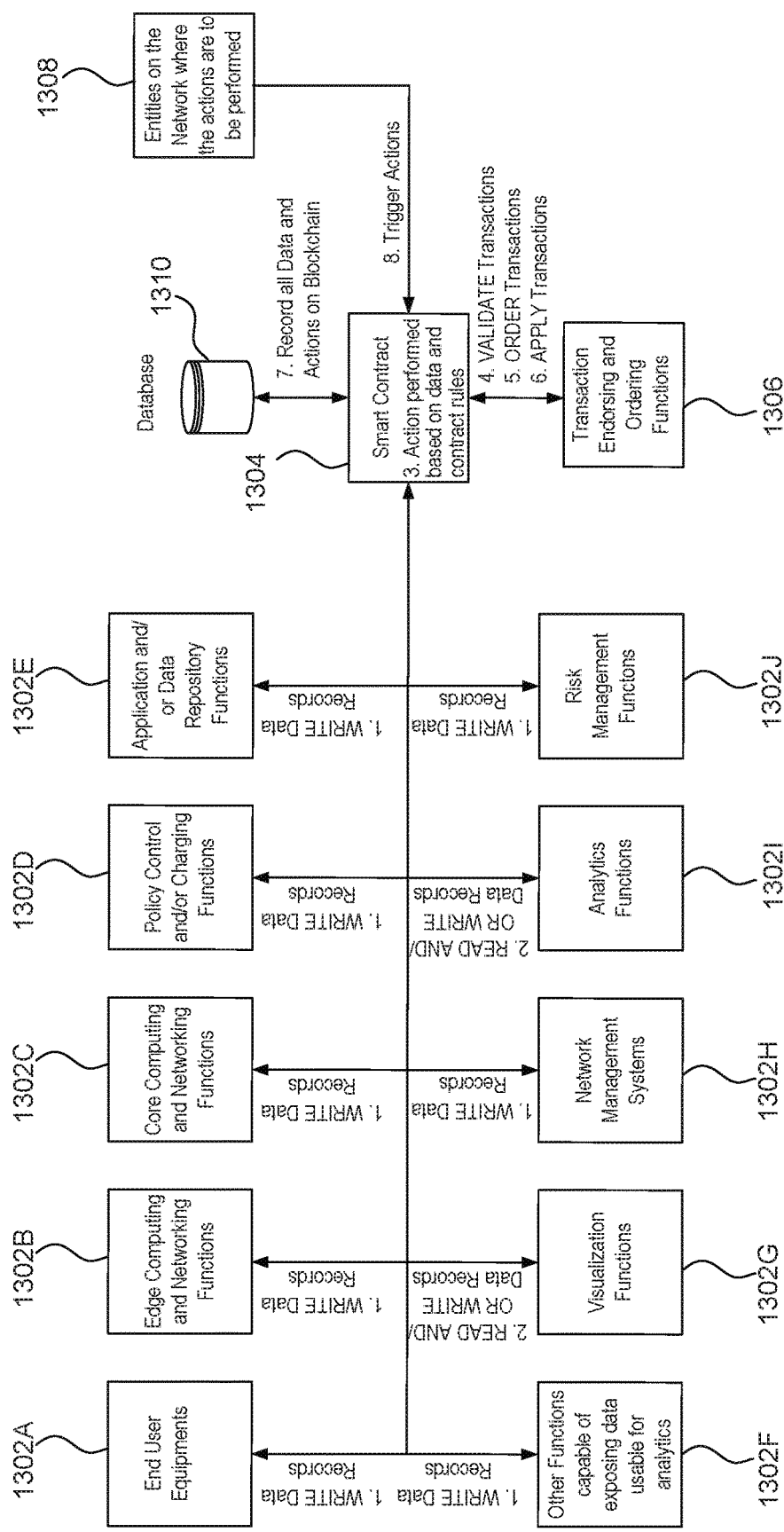

Referring to FIGS. 12 and 13, the third-party components 1202A-J and 1302A-J with various predefined functions are illustrated. The third-party components 1202A and 1302A can permit end-user equipment (e.g., of a third party or network operators) to access and view received and analyzed data (e.g., by other third-party components). The third-party components 1202A and 1302A can be at any location in the network and may not be in communication with any network component 116 (of FIG. 1). The third-party components 1202A and 1302A can be in communication with other third-party components.

The third-party components 1202B and 1302B can derive properties related to the edge of the network and can be located at or near the edge of the network. The third-party components 1202C and 1302C can perform core computing and network functions and can be at or near a center of the network. The third-party components 1202D and 1302D can include network policies (which may be enforced by other third-party components) and permit modification thereof (e.g., by the third party and/or network operators). The third-party components 1202E and 1302E can permit access to repositories storing actions that were and/or were not taken. The third-party components 1202E and 1302E can also permit access and/or modify repositories storing received and/or derived data, which may or may not trigger actions.

The third-party components 1202F and 1302F can allow selection or modification of functions performed by other third-party components. The third-party components 1202G and 1302G can allow visualization of any function of the other third-party components. In some embodiments, third-party components 1202G and 1302G can receive data from other third-party components that derive metadata. Upon receipt of the metadata, the third-party components 1202G and 1302G can derive characteristics and/or perform analytics on the metadata. The third-party components 1202H and 1302H can permit management of the third-party components 1202A-G, 1202I, 1202J, 1302A-G, 1302I, and 1302J by external sources (e.g., a third-party entity or a network provider). The third-party components 1202F-J and 1302F-J may be located anywhere in the network (e.g., at or near the center or edge of the network).

The third-party components 1202I and 1302I can perform a predetermined analytical function (e.g., correlation) on network data packets. In some embodiments, the predetermined analytical function, as well as the data which it's based on, may be specified by the third-party or network provider. The third-party components 1202J and 1302J can determine and/or manage risks related to network data. In some embodiments, the third third-party components 1202J and 1302J can modify the network policies (e.g., actions). For example, if a user seeks to restrict access to an IP address or website, the third-party components 1202J and 1302J can block access to the IP address or website, disable the user's connection to the network, or isolate the user's traffic for later analysis.

Referring to FIG. 1, in some embodiments, the third-party components 118, 120, and 122 can store the smart contracts. In some embodiments, as illustrated in FIGS. 12 and 13, the third-party components 1202A-J and 1302A-J can store the smart contracts 1204 and 1304 in an external database 1206 and 1306. The third-party components 118, 120, and 122 and/or database 1202 and 1310 (of FIGS. 12 and 13) can store multiple smart contracts having different conditions for different actions. In some embodiments, the third-party components 118, 120, and 122 and database 402 and 510 can store multiple smart contracts having different conditions for the same actions or a same condition for multiple actions. The hosts 1602A-D and/or entities 1604A-D can identify associated smart contracts 1608. In some embodiments, the smart contracts 406 and 510 automatically perform the actions upon the conditions being met.

In some embodiments, the third-party components 118, 120, and 122 can dynamically modify the network using the smart contracts. For example, if a network operator or third party desires to monitor end-user behavior and implement specific actions (e.g., scaling up specific edge computing components to enhance user experience based on increased end-user activity), the third-party component 118's smart contract can enforce the collection of metadata per end-user or group of end-users. Subsequently, the third-party component 120's smart contract can correlate metadata per user or group of users and enforce actions to scale up the desired edge computing network components 116 if usage exceeds a statically or dynamically defined threshold. Moreover, if a network operator desires to monitor locations in a network for a specific traffic type and move application service instances from sparsely populated locations to densely populated ones, the third-party component 118's smart contract can enforce a collection of metadata per location or group of locations. Subsequently, the third-party component 120's smart contract can correlate metadata per location or group of locations and enforce relevant actions on the network. Likewise, if a network operator desires to monitor errors in the network and dynamically implement timely corrective and preventive actions to ensure high availability and quality of service, the third-party component 122's smart contract can enforce the collection of metadata for various known and unknown error types and implement the respective actions on the error detection or estimation.

Further, the third-party components 118, 120, and 122 can also maintain and share a distributed ledger for the external network 124. The third-party components 118, 120, and 122 can serve as nodes or computing devices for adding, sharing, and authenticating data on a distributed ledger without intervention from a central administrator or a centralized data storage. The third-party components 118, 120, and 122 can store data relating to network packets received from network components 116 on the distributed ledger. In some embodiments, the third-party components 118, 120, and 122 can store information relating to metadata, characteristics, and/or actions.

The third-party components 118, 120, and 122's request to store data on the distributed ledger can be considered a transaction. In some embodiments, before entering transactions into the distributed ledger, the hosts 1602A-D and entities 1604A-D can request approval from other third-party components 118, 120, and 122. Each third-party component 118, 120, and 122 can receive the other third-party components 118, 120, and 122's response to the request. After each third-party component 118, 120, and 122 determines that there is a consensus among the hosts 1602A-D and entities 1604A-D (e.g., at least a majority approval), the hosts 1602A-D and entities 1604A-D can update their respective distributed ledger. The distributed ledger can be permissioned (e.g., to specific network providers) or permissionless.

Further, in some embodiments, the distributed ledger can be shared among different network providers. For example, multiple network providers can utilize the same distributed ledger to identify characteristics of a particular geographical region. Additionally, in some embodiments, the distributed ledger can be provided for a specific network provider. For example, a network provider can have its own distributed ledger based on the amount of telecommunication handled by its network. Moreover, in some embodiments, the distributed ledgers can also be specific to functions of the third-party components 118, 120, and 122, as will be described in more detail below.

The third-party components 118, 120, 122 may store the actions on the distributed ledger using one or more blockchains. Once data (e.g., a triggered action) is entered into the distributed ledger, the data can be added as a block. Successive blocks can be linked together using cryptography (e.g., cryptographic hash to the prior block), thus linking the blocks together and forming a chain. Once data is added onto the blockchain, the data cannot be altered.

In some embodiments, multiple blockchains may be stored on the blockchain. Each blockchain can be for a different third-party component function or network provider. Further, the blockchains can be accessible by a private key and public key. For example, where the blockchains are for different network providers, the third-party entity managing the blockchain for multiple network providers can have the public key, and the network providers can have the private key. Referring to FIG. 13, the third-party components 1302A-J are utilizing the smart contracts 1304 and a blockchain (not illustrated). As explained above, smart contracts 1304 can include conditions corresponding to metadata and/or characteristics and actions corresponding to the predetermined functions. Upon receipt of metadata and/or characteristics of network packet(s), the third-party components 1302A-J determine if the smart contract's conditions are met or exceeded. In some embodiments, the third-party components 1302A-J can send the smart contract (e.g., conditions) and the received/analyzed data to another third-party component 1306 for verification. The third-party component 1306 can confirm that the third-party components 1302A-J appropriately determined the metadata and/or characteristics of the network packet(s) meet or exceed the conditions. Upon validation, if applicable, the third-party components 1302A-J can perform the action (e.g., at specific geographical locations using the small cells 114, the distributed units 116, and/or the network components 116 of FIG. 1).

Figure 14:
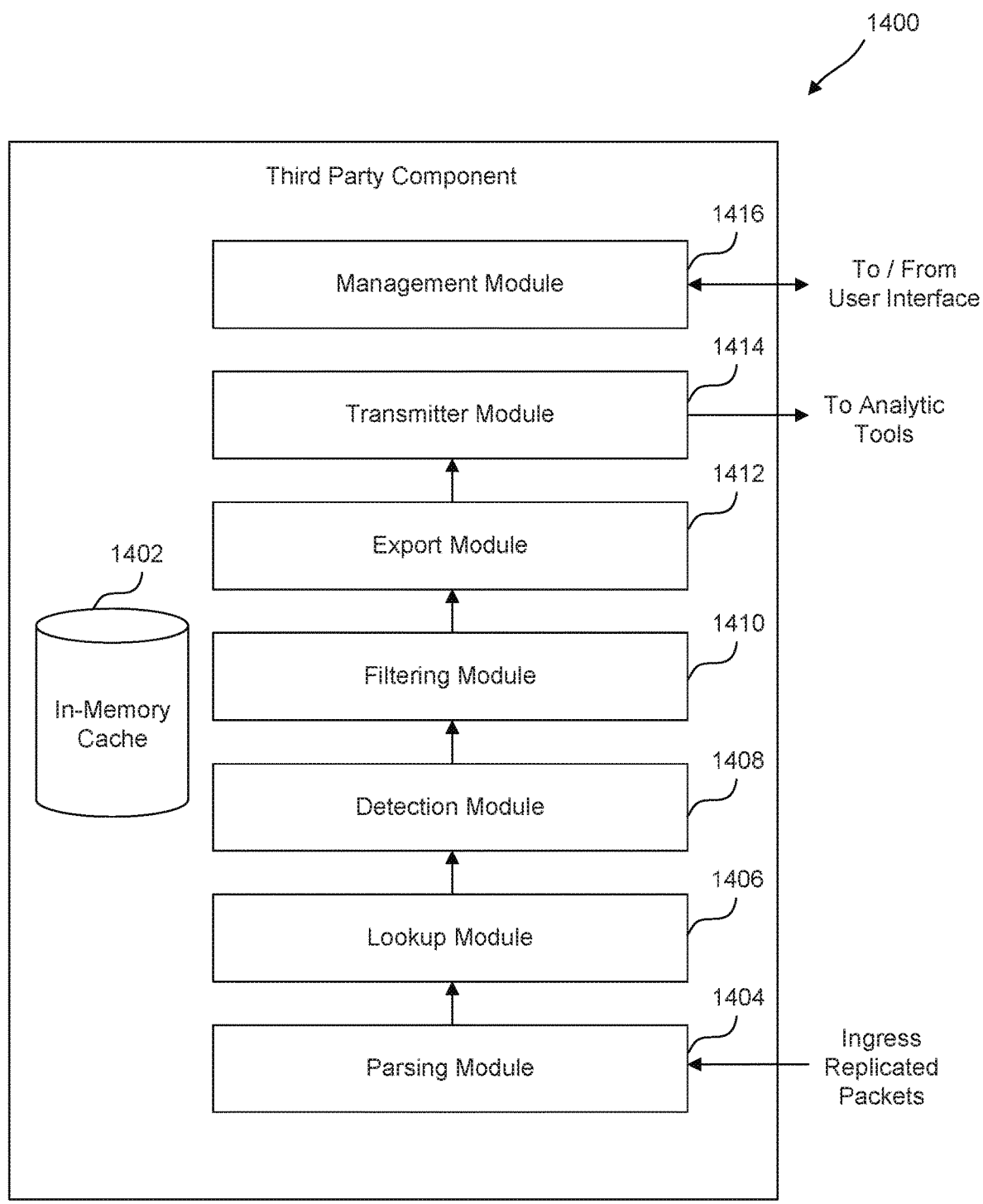
FIG. 14 illustrates a block diagram of a third-party component, according to some embodiments.

FIG. 14 illustrates a block diagram of an example third-party component 1400. The third-party component 1400 can include a memory 1402, a parsing module 1404, a lookup module 1406, a detection module 1408, a filtering module 1410, an export module 1412, a transmitter module 1414, and/or a management module 1416. The memory 1302 can store rules for received flows, as discussed above with respect to FIG. 1. The parsing module 1404 can receive a copy of data from network components that reside at or near the network's edge. The parsing module 1404 can then parse through the received copy of data and extract relevant information. The lookup module 1406 can determine if there are any pertinent rules for performing actions for the extracted information based on the extracted information. The lookup module 1406 can also perform updating and/or creating rules. The detection module 1408 can perform a deep packet inspection of the extracted information to determine the characteristics of the extracted information. The filtering module 1410 can identify relevant characteristics per the network operator's configuration. The export module 1412 can derive metadata for the relevant characteristics. The transmitter module 1414 can forward the metadata to specified external analytical tools. The management module 1416 can permit a third party and/or network operator to configure the modules of the third-party component 1400.

Figure 15A:
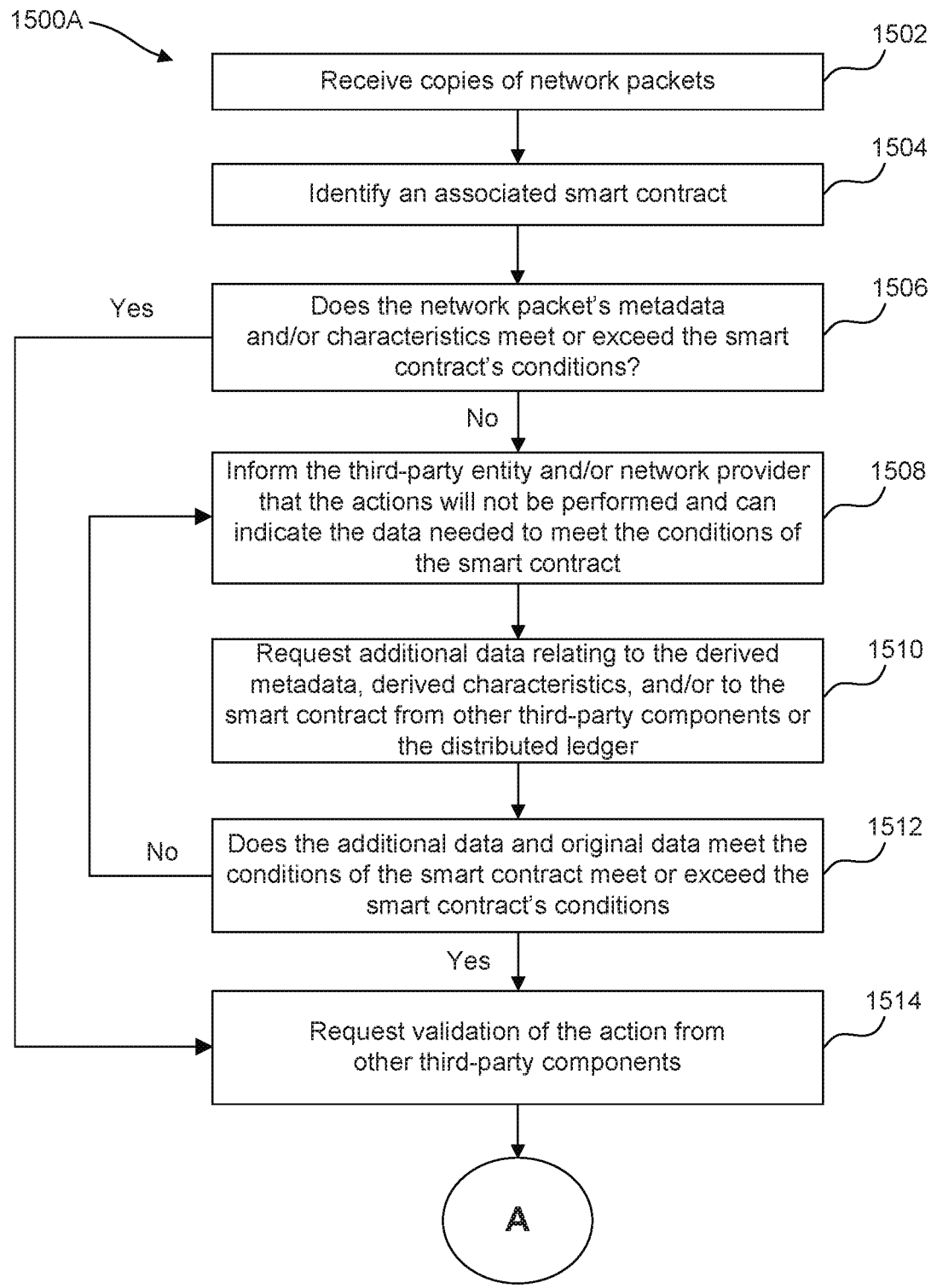
FIGS. 15A and 15B illustrate a workflow of third-party components performing analytical functions using a smart contract, according to some embodiments.
Figure 15B:
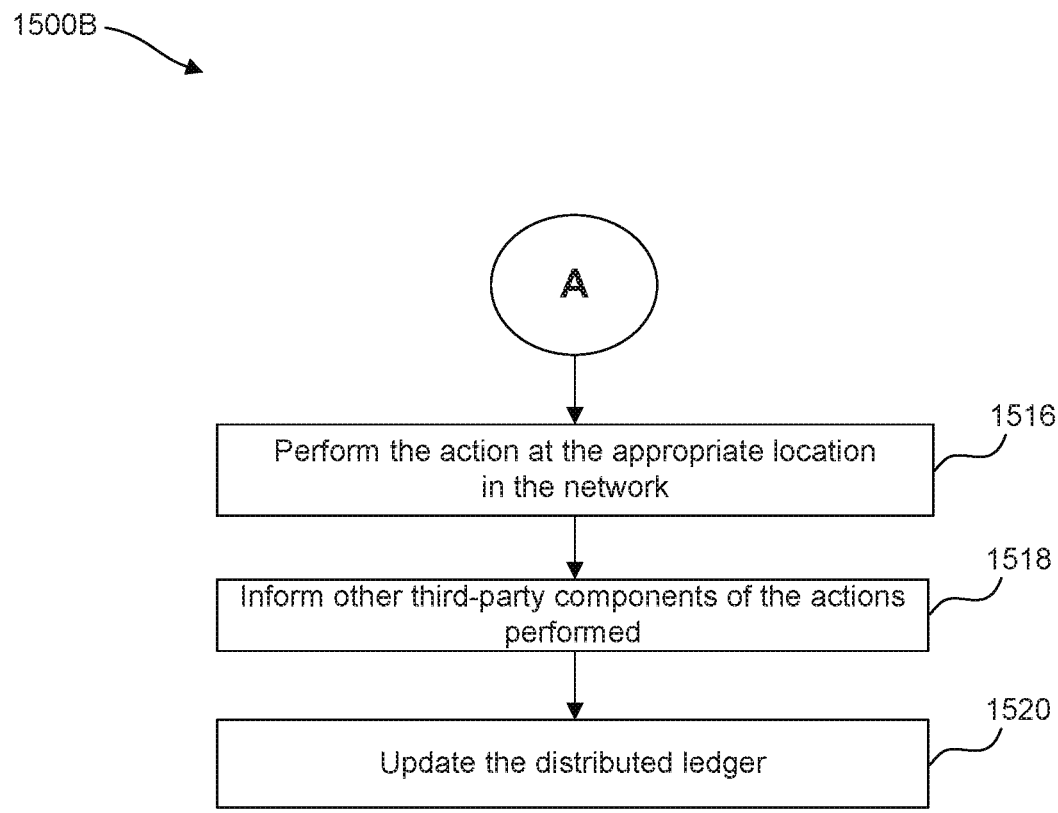

FIGS. 15A and 15B illustrate an example of a workflow 1500A and 1500B of the third-party components utilizing smart contracts and a distributed ledger. Referring to FIG. 15A, at 1502, the third-party components can receive copies of network packets from the network components. In some embodiments, the third-party components can derive metadata and/or characteristics from the network packets. The metadata can include an identity of a user, a location of the user, an application utilized by the user, a network entity utilized by the user, to name a few examples.

At 1504, the third-party components can identify an associated smart contract. The smart contract includes conditions and actions automatically trigged upon the conditions being met. In some embodiments, the smart contract can require verification from other third-party components before triggering the actions.

At 1506, the third-party components determine if the derived metadata and/or characteristics related to the network packets meets the conditions of the smart contracts. If the received data does not meet the conditions of the associated smart contract, the process proceeds to 1508. However, if the received data does meet the conditions of the associated smart contract, the workflow 1500A and 1500B proceeds to 1514.

At 1508, the third-party components can inform the third-party entity and/or network provider that the actions will not be performed and can indicate the data needed to meet the conditions of the smart contract. In some embodiments, the workflow 1500A and 1500B can end at 1508. In some embodiments, the workflow 1500A and 1500B can continue to 1510.

At 1510, the third-party components can request additional data relating to the derived metadata and/or characteristics, and/or to the smart contract, from other third-party components or the distributed ledger. In some embodiments, the distributed ledger can store data in a blockchain. In some embodiments, the third-party components can request additional data stored on specific blocks of the blockchain.

In 1512, the third-party components can determine if the additional data and original data meet the conditions of the smart contract. If the received and additional data does not meet the conditions of the smart contract, the process can return to 1508. However, if the received data does meet the conditions of the smart contract, the process proceeds to 1514.

At 1514, the third-party components can request validation of the action from other third-party components. The other third-party components can confirm that the requested third-party components properly assessed the metadata and/or characteristics of the network packet(s) and that the smart contract's specified action should be taken. In some embodiments, operation 1514 is optional.

At 1516, the third-party components can perform the action at the appropriate location in the network. For example, the third-party components can create an application instance to support the user device's processing of a specific application in a given geographical location.

At 1518, the third-party components can inform other third-party components of the actions performed. In some embodiments, operation 1516 is optional.

At 1520, the third-party components can also update the distributed ledger, for example, by adding a block onto a blockchain stored on the distributed ledger. The block includes the data—as described at 1502 and 1512—and/or the conditions and actions of the associated smart contract—as described at 1504.

Figure 16:
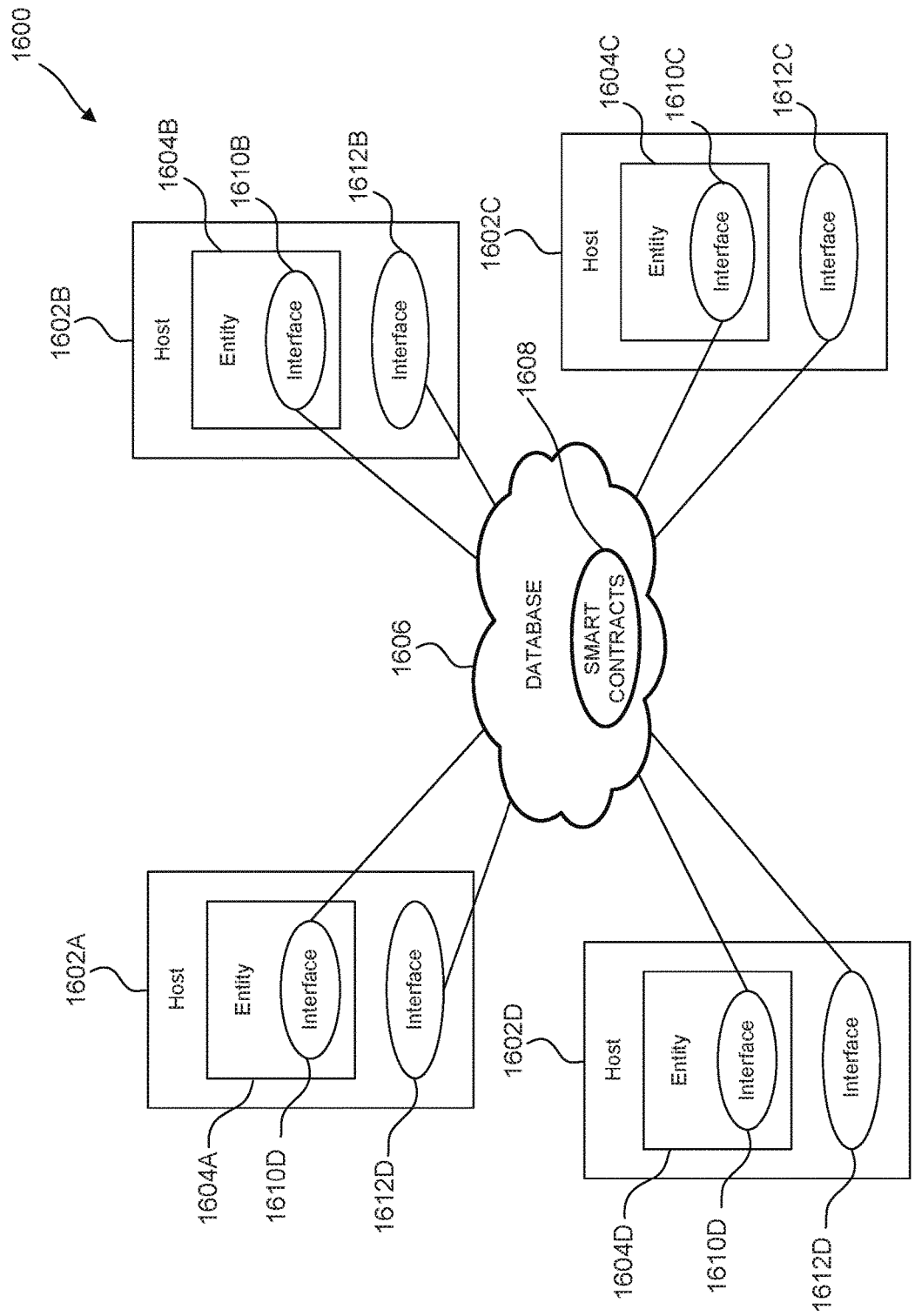
FIG. 16 illustrates a system for automatically maintaining a network, according to some embodiments.

FIG. 16 illustrates a system 1600 for storing transactions identified by the hosts 1602A-D and the entities 1604A-D in a network utilizing smart contracts 1608 stored on a database 1606. The system 1600 includes the hosts 1602A-D, the entities 1604A-D, and a database 1606. The hosts 1602A-D and the entities 1604A-D are a part of a network managed by a third-party entity for a network provider. In some embodiments, the hosts 1602A-D and/or the entities 1604A-D can be provided and/or managed the network provider and/or a third party.

The hosts 1602A-D can be a virtual or physical device (e.g., a server). The hosts 1602A-D can include any number of entities 1604A-D (e.g., 2, 4, 8, or 9) depending on characteristics of the network (e.g., geographical size, congestion, bandwidth utilization, and latency). The entities 1604A-D can be a virtual machine or container running on the hosts 1602A-D and can perform internet protocol functions (e.g., IP Protocol, UDP Protocol, and TCP Protocol). Each entity 1604A-D can be configured to process one or more applications. In some embodiments, each host 1602A-D can have multiple entities 1604A-D supporting different geographical regions or the same geographical region.

In some embodiments, the hosts 1602A-D and/or the entities 1604A-D can provide telecommunication for different geographical regions or the same geographical region. In some embodiments, the hosts 1602A and 1602B and the entities 1604A and 1604B can provide telecommunication for one geographical region of the network, while the hosts 1602C and 1602D and the entities 1604C and 1604D can provide telecommunication for another geographical region of the network. In some embodiments, the hosts 1602A-D and/or the entities 1604A-D can provide telecommunication for multiple geographical regions in the network.

Moreover, the hosts 1602A-D and/or the entities 1604A-D can receive copies of data packets from network components 116 (of FIG. 1). In the same fashion as described above with respect to the hosts 1602A-D and the entities 1604A-D (of FIG. 16), the hosts 1602A-D and/or the entities 1604A-D can decode and parse through the data packets and derive metadata and/or characteristics of the network packet. The characteristics can relate to user identify or usage, network traffic, and network capacity characteristics of interest, in some embodiments. For example, as explained above, example characteristics can include packet throughput, bandwidth utilization, number of traffic flows, average latency, end-point behavior, user behavior, control processor utilization, and/or memory utilization.

The hosts 1602A-D and/or the entities 1604A-D can perform various analytical functions for the network. For example, the hosts 1602A-D and the entities 1604A-D can perform analytical functions (e.g., predicting and clustering) for a specific characteristic (e.g., a geographical location of users) of the network. The hosts 1602A-D and/or the entities 1604A-D can also be in communication with each other. Upon receipt of pertinent data, the hosts 1602A-D and/or the entities 1604A-D can forward the data to the hosts 1602A-D and/or the entities 1604A-D for performing their respective functions of characteristics on the network. This can allow one or more hosts 1602A-D and/or the entities 1604A-D to interact with the network (e.g., network components), thus allowing the hosts 1602A-D and the entities 1604A-D and/or network to operate more efficiently.

FIGS. 4-7 illustrate various types of prediction engines 400, 500, 600, and 700 utilized by the hosts 1602A-D and the entities 1604A-D (of FIG. 16) for predicting particular characteristics in a network for a desired period of time, according to some embodiments. In some embodiments, the desired period of time can be provided by the network provider, for example, via an application provided to the user devices 102 (of FIG. 1). FIG. 4 illustrates the user-operation prediction engine 400 for predicting future operations of users in the network. FIG. 5 illustrates the application-usage prediction engine 500 for predicting future usage of specific types of applications. FIG. 6 illustrates the location-behavior prediction engine 600 for predicting data usage for particular times and/or locations (e.g., 7:00 AM-5:00 PM in office buildings) in the network, the type applications used at specific locations (e.g., social media application on campuses) in the network, or any other network characteristic described above at particular locations in the network. FIG. 7 illustrates the network-entity behavior prediction engine 700 for predicting future user behavior of a specific location in the network.

Referring to FIGS. 4-7, the user-operation prediction engine 400, the application-usage prediction engine 500, the location-behavior prediction engine 600, and the network-entity behavior prediction engine 700 can receive a respective number of inputs 402, 502, 602, and 702, which can be from different sources. For example, the inputs 402, 502, 602, and 702 can be from data extracted from the received data packets, data provided by the network providers, data received/determined from other third party or network components, and/or the outcome of the prediction engine, as will be described below.

Referring to FIG. 4, the user-operation prediction engine 400's inputs 402 can include a user identity, time-series activity, anomaly information, billing information, current user profile, current location, and/or previous predictions. The user identity can be for a single user or a group of users. The user identity can be a subscription permanent identifier (SUPI), a permanent equipment identifier (PEI), a mobile station international subscriber directory number (MSISDN), and/or a generic public subscription identifier (GPSI).

Referring to FIG. 5, the application-usage prediction engine 500's inputs 502 can include an application identity, time-series information of key performance indicators (KPIs), time-series information of relevant users, time-series information of relevant locations, time-series information of the application anomalies, and/or previous predictions. The KPIs can include latency, throughput, and volume of data consumed. The time-series information of relevant users can relate to those who assessed the application and can include groups and unique identity. The time-series information of the relevant locations and the relevant application anomalies can be from which the application was assessed.

Referring to FIG. 6, the location-behavior prediction engine 600's inputs 602 can include a location, time series user information, time-series network activity information, time-series information of KPIs, and/or previous predictions. The time series user information can be user density, user groups or types, device types, and/or unique user identity. The times series application information can relate to the specific location monitored. The times series network information can be for a particular network component dedicated to the specific location (e.g., a radio tower and a network edge). The time-series information of KPIs can include latency, the volume of the data consumed, and/or throughput utilization.

Referring to FIG. 7, the network-entity behavior prediction engine 700's inputs 702 can include a network entity identity or group identifier, time-series user information, time-series application information, time-series information of KPIs, time-series anomaly information, and/or previous predictions. The time-series user information can include user density, user groups or types, device types, and/or unique user identity. The time-series application information can be accessed through the network entity. The time-series information of KPIs can include latency, the volume of data consumed, and/or throughput utilization. The time-series anomaly information can include a history of anomalies on the network entity.

Referring to FIGS. 4-7, based on the inputs 402, 502, 602, and 702, the user operation prediction engine 400, the application usage prediction engine 500, the location behavior prediction engine 600, and the network-entity behavior prediction engine 700 can respectively provide unique outputs 404, 504, 604, and 704. The outputs 404, 504, 604, and 704 can provide predicted time series activity. For example, the user-operation prediction engine 400's output 404 and the application-usage prediction engine 500's outputs 504 can provide activities and/or anomalies for user operation and a user application usage over a specified time in the future, respectively. The location-behavior prediction engine 600's output 604 can provide a behavior pattern at a geographical location (e.g., estimated KPI, user groups, and anomalies) for a given time period in the future. The network-entity behavior prediction engine 700's output 704 can provide an exact behavior by the network components 116 (of FIG. 1) over a period of time in the future. The predicted time series activity of the outputs 404, 504, 604, and 704 can include predicted future anomalies.

Further, the user-operation prediction engine 400, the application-usage prediction engine 500, the location-behavior prediction engine 600, and the network-entity behavior prediction engine 700 can store the outputs 404, 504, 604, and 704 for a given period of time in the database 406, 506, 606, and 706, respectively. The user-operation prediction engine 400, the application-usage prediction engine 500, the location-behavior prediction engine 600, and the network-entity behavior prediction engine 700 can then provide the outputs 404, 504, 604, and 704 as an input to a deep learning network 804 (of FIG. 8) when analyzing the given period of time. This can allow the user-operation prediction engine 400, the application-usage prediction engine 500, the-location behavior prediction engine 600, and/or the network-entity behavior prediction engine 700 to more accurately predict the respective outputs 404, 504, 604, and 704 over a period of time in the future.

FIG. 8 illustrates an autoencoder-deep learning network configuration 800 utilized by prediction engines 400, 500, 600, and 700 (of FIGS. 4-7), according to some embodiments. The autoencoder-deep learning network configuration 800 can include the autoencoder 802 and the deep learning network 804. The autoencoder 802 can receive inputs over a specified period of time (e.g., 1 hour, 1 week, 1 month, and 1 year). As described above, the prediction engines 400, 500, 600, and 700 (of FIGS. 4-7) may receive different inputs. The autoencoder 802 utilized by the user-operation prediction engine 400 can receive inputs relating to user identity, time-series activity and anomaly information, billing information, current user profile, current location, and/or previous predictions. The autoencoder 802 utilized by the application-usage prediction engine 500 can receive inputs relating to application identity, time series of KPIs, other relevant information, other relevant users, application anomalies, and/or previous predictions. The autoencoder 802 utilized by the location-behavior prediction engine 600 can receive inputs relating to a location, time series user information, time-series network activity information, time-series information of KPIs, and/or previous predictions. The autoencoder 802 utilized by the network-entity behavior prediction engine 700 can receive inputs relating to network entity identity or group identifier, time-series user information, time-series application information, time-series information of KPIs, time-series anomaly information, and/or previous predictions.

In some embodiments, the autoencoder 802 can be trained to determine a representative data (e.g., compressed data) using designated algorithms based on the respective inputs of the prediction engines 400, 500, 600, and 700 (of FIGS. 4-7). In doing so, the autoencoder 802 can filter out unneeded or unrepresentative data and retain applicable information based on, for example, previous predictions. In some embodiments, the amount of representative data can be less than the amount of input data.

The autoencoder 802 provides the representative data as input to the deep learning network 804. The deep learning network 804 can include a number of hidden layers. For example, in some embodiments, the deep learning network 804 can include 16 hidden layers. The number of neurons can vary across the hidden layers. Each neuron receives input from autoencoder 802 and can derive a part of the outcome ultimately provided by the deep learning network 804. The deep learning network 804 can predict the activity for a desired period of time in the future. In doing so, the deep learning network 804 can also predict expected anomalies during the desired period of time. In some embodiments, the autoencoder 802 may be a variational autoencoder. In some embodiments, the deep learning network 804 may be a deep belief network and a neural network, to provide a few examples.

Referring to FIG. 16, as described above, the hosts 1602A-D and the entities 1604A-D can cluster the characteristics of data packets (e.g., user's identification, applications, network entities, and locations) into a number of groups (e.g., 2, 3, 5, and 10). In some embodiments, the hosts 1602A-D and the entities 1604A-D can use a neural network-based mechanism that transforms the various characteristics of a data packet into a latent representation of the data packets. Example neural network-based mechanisms include a deep learning network, a multilayer perceptron, a deep belief network, a convolutional neural network, a variational autoencoder, and a generative adversarial network, to provide a few examples. Accordingly, for example, the hosts 1602A-D and the entities 1604A-D can provide a latent representation relating to the user device 102's (of FIG. 1) application usage behavior based on locations and/or mobility patterns.

After determining the latent representation, the hosts 1602A-D and entities 1604A-D can use a deep learning network for clustering the data packets. In some embodiments, the hosts 1602A-D and entities 1604A-D can perform classification based on characteristics selected by the network provider, for example, in an application provided to the user devices 102. FIG. 9 illustrates an example of a deep learning network 900 that can receive inputs 902 of various latent representations of particular characteristics relating to a user, geographical location, and/or entity. For example, as stated above, the latent representation can relate to a user device's application usage behavior based on locations and/or mobility patterns. As explained above, with respect to FIG. 8's deep learning network 800, the deep learning network 900 can identify a predetermined number of hidden layers 904. For example, in some embodiments, the predetermined number of hidden layers 904 can be 16. The deep learning network 900 can then derive the outputs 906 corresponding to the associated clusters 908. In some embodiments, the data packets can be grouped based on a user's behavioral aspects as specified in the derived characteristics (e.g., subscribers, applications, network entities, and locations). Behavioral aspects for users can include application usage, the volume of data consumed, and mobility behavior, to provide a few examples. Behavioral aspects for applications can include the type of data (e.g., video), a predefined throughput requirement, and average latency, to provide a few examples. Behavioral aspects for network entities can include network capacity, average load, user density, and anomaly characteristics. Behavioral aspects for geographical locations can include user density, anomaly characteristics, and most-used application types, to provide a few examples.

FIG. 10 illustrates an example clustering 1000 of packets performed by the hosts 1602A-D and entities 1604A-D (of FIG. 16) for a particular characteristic (e.g., user's identification, applications, network entities, and/or locations). For example, the hosts 1602A-D and entities 1604A-D can determine that the packets are to be grouped into three separate groups 1002A-C. The three separate groups 1002A-C can be defined by one or more parameters 1004A-B of the characteristic. As described above, parameters of subscribers can relate to data used to monitor application usage, the volume of data consumed, and mobility behavior. Parameters of applications can relate to data used to monitor a data type, a throughput requirement, and an average latency. Parameters of network entities can relate to data used to monitor capacity, average load, subscriber density, and/or anomaly characteristics. Parameters of locations can relate to data used to monitor subscriber density, anomaly characteristics, and/or most-used application dates. In some embodiments, the hosts 1602A-D and entities 1604A-D determine that there are three separate groups 1002A-C based on application usage and location. The groups 1002A-C can be defined (or illustrated) based on a first parameter (e.g., location) 1004A and a second parameter (e.g., application usage) 1004B.

Referring to FIG. 16, the hosts 1602A-D and entities 1604A-D can classify data packets into a number of groups (e.g., 2, 3, 5, and 10) based on derived characteristics (e.g., user identification, application, network entities, and locations). In some embodiments, the hosts 1602A-D and entities 1604A-D can perform classification based on characteristics selected by the network provider, for example, in an application provided to the user devices 102. The hosts 1602A-D and entities 1604A-D can use a binary or multi-class classifier, which is based on classification algorithms implementing decision trees, support vector machine, naïve Bayes trees, k-nearest neighbor algorithm, and/or density-based spatial clustering of applications with noise. The users can be classified based on an associated identifier, a volume of data being transported, a roaming identification, and/or a specific device type. The applications can be classified based on known specific patterns. The network entities and locations can be classified as pre-defined labels based on specific characteristics.

FIG. 11 illustrates an example classification 1100 of packets performed by the hosts 1602A-D and entities 1604A-D (of FIG. 16) for a particular characteristic (e.g., user's identification, applications, network entities, and locations). For example, the hosts 1602A-D and entities 1604A-D can determine that the packets are to be grouped into three separate groups 1102A-C. The three separate groups 1102A-C can be defined by one or more parameters 1104A-B of the characteristic. Groups 1102A-C and parameters 1104A-B are similar to group 1102A-C and parameters 1104A-B described above with respect to FIG. 10.

Referring to FIG. 16, as noted above, the hosts 1602A-D and entities 1604A-D may have predefined functions, which may be specified by a network provider. In some embodiments, the third-party component 118, 120, and 122's predefined functions can depend on network packet's characteristics and/or metadata. In some embodiments, the predefined functions of the hosts 1602A-D and entities 1604A-D can be related to the end-user experience, application scaling, cost optimization, and/or corrective/preventive actions, to provide a few examples. The end-user experience can relate to a user quality service, a user observed error rate, an uplink or downlink speed, an average user bandwidth, and/or an average user throughput, in some embodiments. The end-user experience can relate to a specific user in a particular geographical region or a group of users in a particular geographical region. As described above, application scaling can relate to an application quality of service, upload or downlink application speed, and/or a user response time, in some embodiments. Cost optimization can relate to required computing resources, memory resources, and/or memory resources for maintaining end-user experience. Corrective/preventive actions can relate to a network specified response to an unforeseen event, Further, in some embodiments, one or more hosts 1602A-D and entities 1604A-D can have predefined functions relating to determining and/or aggregating characteristics over a period of time (e.g., 30 seconds, 5 minutes, and 30 minutes). In some embodiments, one or more hosts 1602A-D and entities 1604A-D can also perform analytical functions, for example, as described above with respect to FIGS. 4-11. For example, for a specific application utilized by the user devices 102, the hosts 1602A-D and entities 1604A-D can determine the number of users, a type of users, a location of users, an average number of users by device types, a user growth rate, a user retention rate, a user churn rate, an average length of session per user, an average session interval per user, a mobility patterns per user, an average radio strength of users, an average latency, a total throughput data, an average throughput data per user, a total bandwidth utilization, an average bandwidth utilization per user, a quality of service, types of detected errors, an error rate for each detected error, an average network response time, and/or an average request rate, to provide a few examples.

Further, the hosts 1602A-D and/or entities 1604A-D can utilize smart contracts 1608 for automatically maintaining and/or optimizing the network based on the network packet's metadata and/or characteristics. Each smart contract 1608 include one or more conditions and one or more associated actions. The conditions can be related to detecting whether the host 1602A-D's load and/or the entity 1604A-D's load meets or exceeds a predetermined threshold and can be based on metadata and/or characteristics of network packets, according to some embodiments. The actions can be related to orchestration and/or optimization of the hosts 1602A-D and/or the entities 1604A-D. In some embodiments, the actions can relate to generating additional hosts 1602A-D for a particular geographical location, removing excess hosts 1602A-D from a particular geographical location, and/or moving the hosts 1602A-D from one geographical location to another geographical location. In some embodiments, the actions can relate to generating additional entities 1604A-D for a particular host 1602A-D, removing excess entities 1604A-D from a particular host 1602A-D, and moving the entities 1604A-D from one host 1602A-D to another host 1604A-D (e.g., from one location to another location or within the same location). In some embodiments, the actions can relate to the hosts 1602A-D and/or entities 1604A-D filtering copies of data packets, forwarding copies of data packets to an external location, and/or dropping data packets. In some embodiments, the actions can relate to the hosts 1602A-D and/or the entities 1604A-D requesting assistance from other hosts 1602A-D and/or entities 1604A-D (e.g., from different geographical regions and/or networks). In some embodiments, the actions can relate to timely informing network providers of possible network interruptions using, for example, analyzing functions described above.

Further, the hosts 1602A-D and/or the entities 1604A-D can include interfaces 1610A-D and 1612A-D to identify smart contracts, apply the rules of the smart contracts, validate recommended actions of the smart contracts, and initiate the recommended actions in a similar fashion using interfaces 1606A-C. For example, host 1602A and/or entity 1604A can identify metadata corresponding to rules of the smart contract 1608 via interfaces 1610A and 1612A. Subsequently, another host 1602C and/or entity 1604C can perform actions via interfaces 1610C and 1612C.

The hosts 1602A-D and/or the entities 1604A-D can request or be preconfigured to utilize a distributed ledger created by the network provider and/or the third-party entity. The distributed ledger can be shared among the hosts 1602A-D and/or the entities 1604A-D. In some embodiments, the hosts 1602A-D and/or the entities 1604A-D each store a copy of the distributed ledger. The distributed ledger can represent a replicated, shared, and synchronized copy of network data received by hosts 1602A-D and/or entities 1604A-D across various geographical areas in the network.

As discussed above, the hosts 1602A-D and/or the entities 1604A-D can derive metadata, characteristics, and/or analytics of the network components 116 (of FIG. 1). In some embodiments, the hosts 1602A-D and/or the entities 1604A-D send derived metadata characteristics, and/or analytics of the network components 116 (of FIG. 1) to the distributed ledger as transactions. In some embodiments, the transactions can be grouped together for a particular geographical area. In some embodiments, the transactions can grouped together based on a particular characteristic.

The hosts 1602A-D and/or the entities 1604A-D can also store smart contracts. As discussed above, the smart contracts can be associated with different conditions and/or actions. The conditions/actions can be associated with different metadata, characteristics, and/or analytics of the network components 116 (of FIG. 1). In some embodiments, the smart contracts can be associated with various transactions relating to the same metadata, characteristics, and/or analytics.

As also discussed above, the hosts 1602A-D and/or the entities 1604A-D can have different functions. In some embodiments, upon the distributed ledger receiving derived information (e.g., metadata, characteristics, and/or analytics) from a particular host 1602A-D and/or a particular entity 1604A-D, the distributed ledger can notify the hosts 1602A-D and/or the entities 1604A-D storing a smart contract having conditions associated with the derived information. In some embodiments, the hosts 1602A-D and/or the entities 1604A-D can then compare the derived information to the smart contract's conditions. In some embodiments, when the derived information meets or exceeds the smart contract's conditions, the hosts 1602A-D and/or the entities 1604A-D can trigger the smart contract's action. After triggering the smart contract's action, the hosts 1602A-D and/or the entities 1604A-D can generate a transaction and send the transaction to the distributed ledger.

In some embodiments, prior to the smart contract's action being triggered, other hosts 1602A-D and/or entities 1604A-D can be required to validate the actions. In some embodiments, the hosts 1602A-D and/or the entities 1604A-D can generate a transaction including the smart contract, derived information, and the comparison outcome and send the transaction to the distributed ledger. In some embodiments, each of the hosts 1602A-D and/or the entities 1604A-D can generate a transaction based on their validation results.

As described with respect to the third-party components 118, 120, and 122 of FIG. 1, the hosts 1602A-D and/or entities 1604A-D can utilize blockchains on the distributed ledger in a similar fashion. The hosts 1602A-D and/or entities 1604A-D can store the transactions as blocks on the blockchain. Each block can contain one or more transactions and can be linked together using cryptograph. Further, in some embodiments, the hosts 1602A-D and/or entities 1604A-D can utilize multiple blockchains for different networks and/or network providers. In some embodiments, each blockchain can include multiple channels for communicating with other hosts 1602A-D and/or entities 1604A-D for storing different types of data, for example, one for metadata, characteristics, triggered actions, analytics, and/or each smart contract, to provide a few examples. In some embodiments, the blockchains can be accessible by a private key and public key. For example, where the blockchains are for different network providers, the third-party entities can have the public key, and the network providers can have the private key.

Figure 17:
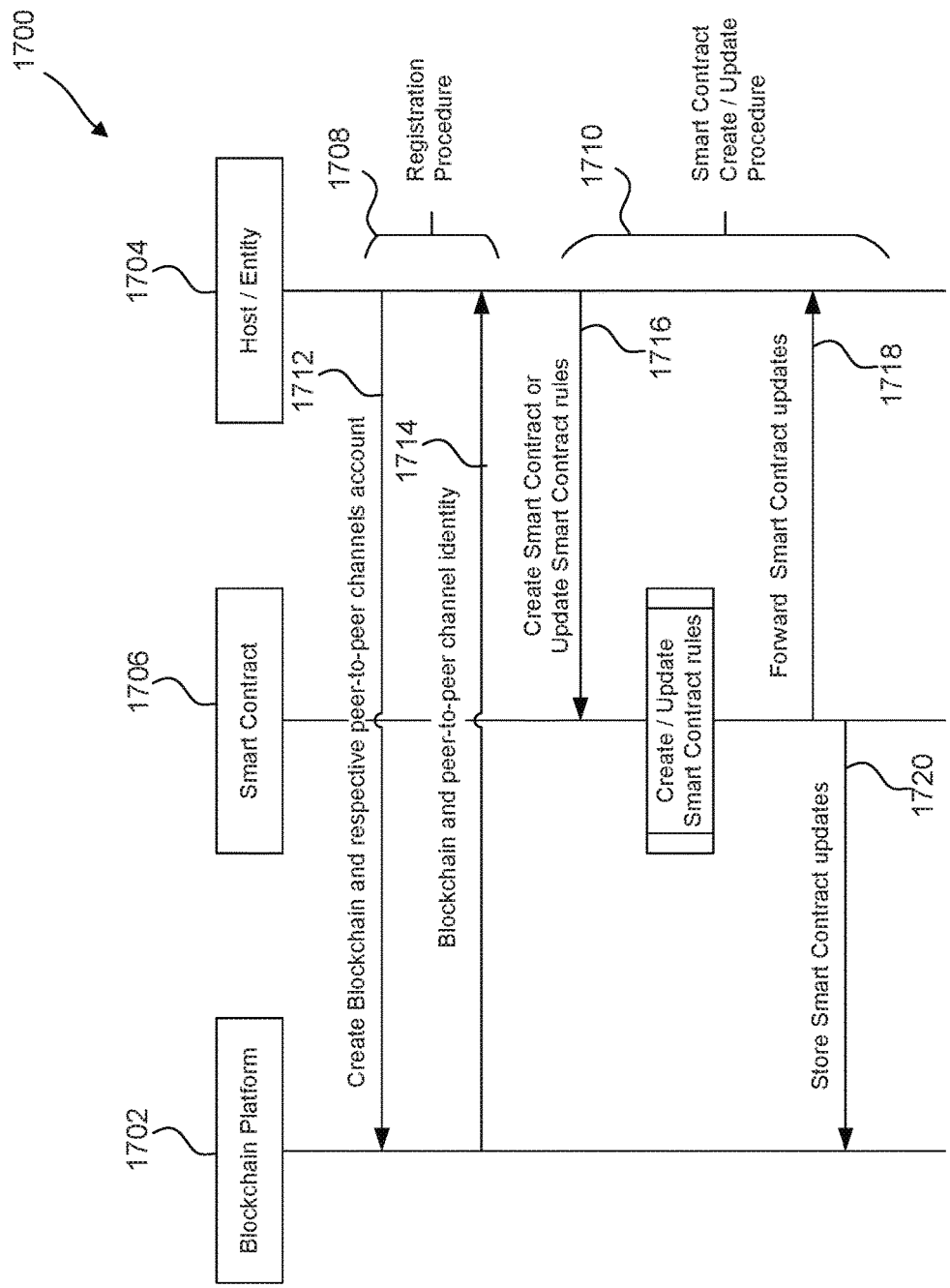
FIGS. 17 and 18 illustrate workflows executed by hosts and/or entities for automatically maintaining a network, according to some embodiments.

FIG. 17 illustrates a workflow 1700 executed by the host/entity 1704 for automatically maintaining a network, according to some embodiments. Workflow 1700 includes a registration procedure 1708 and a smart contract creation and/or updating procedure ("smart contract procedure") 1710.

For the registration procedure 1708, at 1712, the host/entity 1704 can request access with a blockchain 1702 via a specified channel. In some embodiments, each blockchain can include multiple channels that each store different types of data, for example, one of metadata, characteristics, triggered actions, and analytics, to provide a few examples.

At 1714, the host/entity 1704 can be provided access to the requested channel of the blockchain 1702. In some embodiments, the host/entity 1704 can only be granted access upon approval of a consensus of hosts/entities.

For the smart contract procedure 1710, in some embodiments, at 1716, the host/entity 1704 can create a smart contract 1706 or update the smart contract 1706's rules. In some embodiments, the smart contract 1706 can be created and/or updated manually by a user (e.g., a network provider or a third party). In some embodiments, the smart contract 1706 can be updated based on existing data of network packets (e.g., metadata and/or characteristics). For example, when a new host/entity is created for a particular geographical area, the numerical values relating to data of conditions of a smart contract for generating new hosts/entities can increase by, for example, 25%.

In some embodiments, at 1718, the host/entity 1704 or an external database (not illustrated) can send the smart contract 1706 to the host/entity 1704 in response to a request from the host/entity 1704.

At 1720, the smart contract 1706 can store the smart contract updates on the blockchain platform 1702. In some embodiments, the smart contract updates can be based on a triggering of action and/or a failure of triggering of an action.

Figure 18:
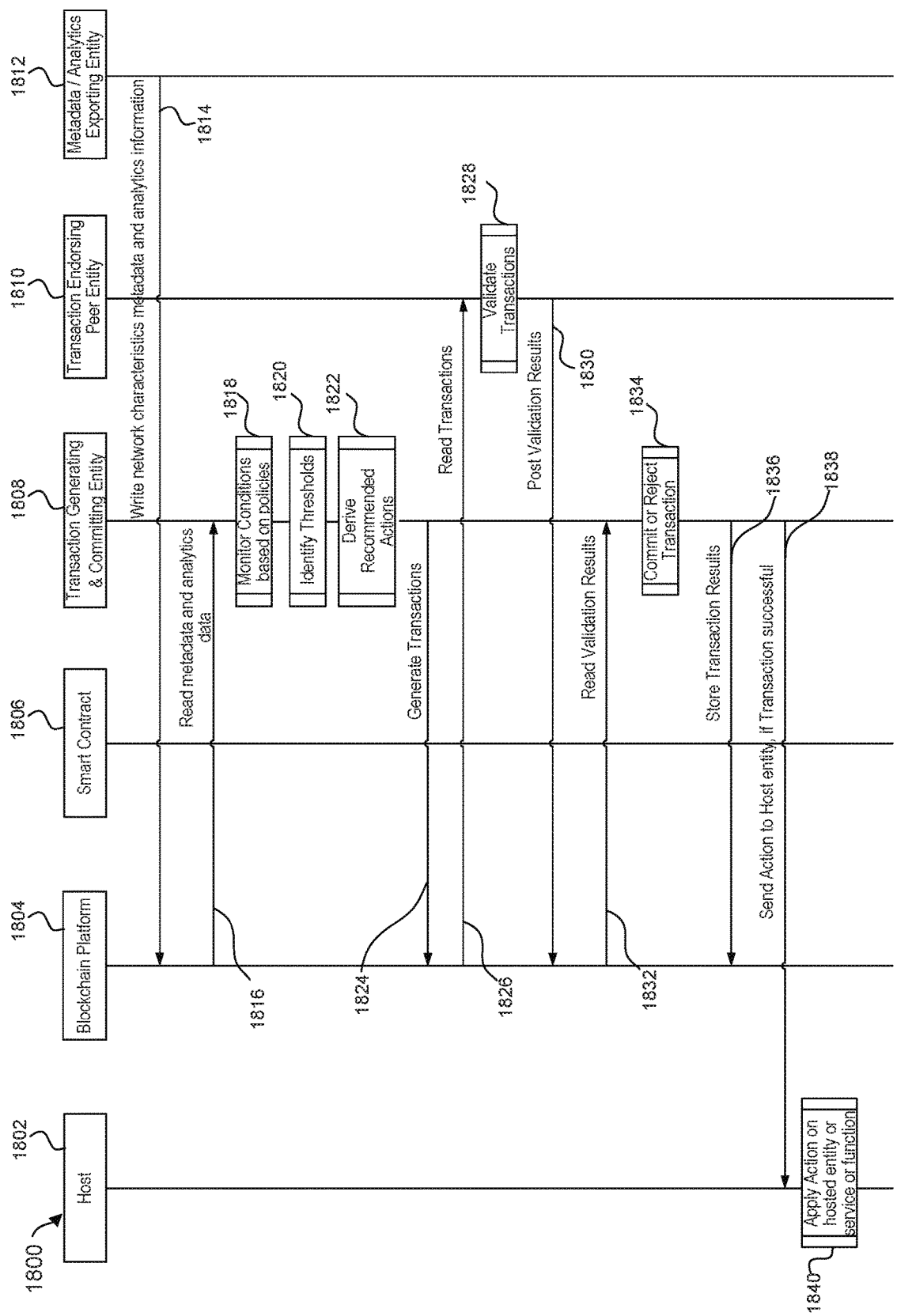

FIG. 18 illustrates a workflow 1800 executed by hosts 1802 and/or entities 1808, 1810, and 1812 for automatically maintaining a network, according to some embodiments. In some embodiments, the workflow 1800 can permit a network to increase its capacity to maintain data being sent between users, from a user to a network component, and/or from a network component to a user in a geographical area with user intervention.

The workflow 1800 includes a host 1802, a blockchain platform 1804, a smart contract 1806, a transaction generating and committing entity (TGCE) 1808, a transaction endorsing peer entity (TEPE) 1810, and a metadata/analytics exporting entity (MAEE) 1812. The blockchain platform 1804 can include the host 1802, the TGCE 1808, the TEPE 1810, the MAEE 1812, and a distributed ledger (not illustrated).

Starting at 1814, the MAEE 1812 can submit derived characteristics, metadata and analytics information relating to a network to the blockchain platform 1804. In some embodiments, the MAEE 1812 can submit the derived characteristics, metadata and analytics information as transactions. In some embodiments, the analytics can be a prediction of a particular characteristic for a given period of time in the future. In some embodiments, the characteristics, metadata and analytics information cannot be submitted to the blockchain platform 1804 until approval from the host 1802, the TGCE 1808, and the TEPE 1810.

At 1816, the blockchain platform 1804 can send metadata and analytics information to the TGCE 1808. In some embodiments, the blockchain platform can send the metadata and analytics information upon the MAEE 1812 determining that the received metadata relates to the conditions of the TGCE 1808's smart contract 1806. The TGCE 1808 can compare the received metadata to conditions based on network policies 1818 (e.g., generating hosts/entities, removing hosts/entities, and/or moving hosts/entities) of the smart contract 1806 and identify network thresholds 1820 of the conditions based on network policies 1818. The TGCE 1808 can determine that the received data triggers recommended actions 1822 of smart contract 1806.

At 1824, the TGCE 1808 can generate a transaction for validation to perform the recommended action 1822 and send the transaction to the blockchain platform 1804. In some embodiments, the transaction can include the received metadata and the smart contract 1806.

At 1826, the blockchain platform 1804 can send the transaction to the TEPE 1810 for validation.

At 1830, the TEPE 1810 can post the results on the blockchain platform 1804. In some embodiments, the TEPE 1810 can add the transaction as a block on the blockchain and include the associated smart contract, metadata, and analytics information.

At 1832, the blockchain platform 1804 can send the validation results to the TGCE 1808, which can accept or reject the transaction 1834.

At 1836, the TGCE 1808 can store transaction results (e.g., acceptance or rejection) on the blockchain platform 1804 (e.g., the distributed ledger).

At 1838, if successful, the TGCE 1808 can send the action to the host 1802, which can then apply the action on the host or entity 1840.

Figure 19:
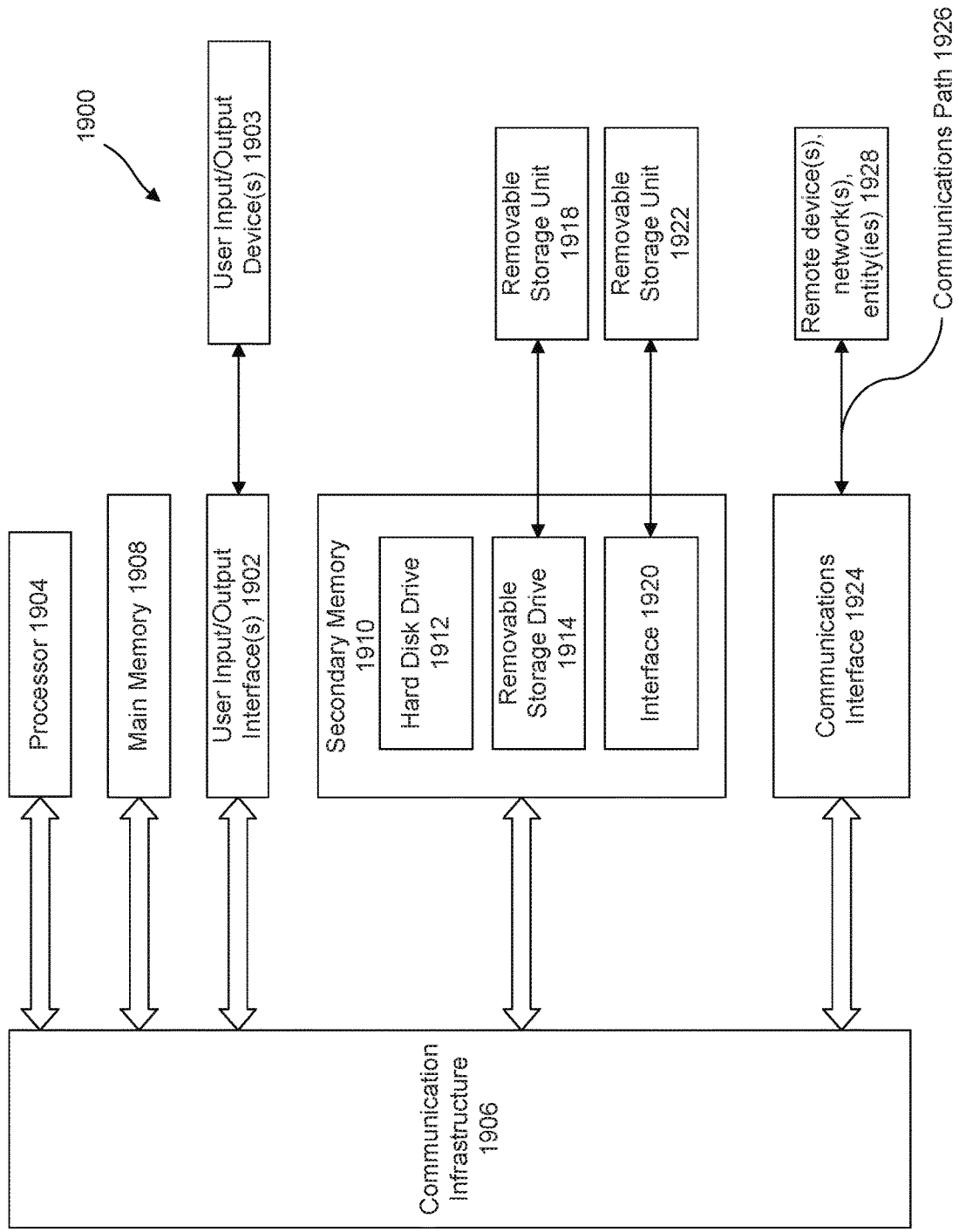
FIG. 19 is an example computer system for implementing various embodiments.

Various embodiments, as described above, can be implemented, for example, using one or more well-known computer systems, such as the computer system 1900 shown in FIG. 19. One or more computer systems 1900 can be used, for example, to implement any of the embodiments discussed herein, as well as combinations and sub-combinations thereof.

Computer system 1900 can include one or more processors (also called central processing units, or CPUs), such as a processor 1904. Processor 1904 can be connected to a communication infrastructure or bus 1906.

Computer system 1900 can also include user input/output device(s) 1903, such as monitors, keyboards, pointing devices, etc., which can communicate with communication infrastructure 1906 through user input/output interface(s) 1902.

One or more processors 1904 can be a graphics processing unit (GPU). In an embodiment, a GPU can be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1900 can also include a main or primary memory 1908, such as random access memory (RAM). Main memory 1908 can include one or more levels of cache. Main memory 1908 can have stored therein control logic (i.e., computer software) and/or data.

Computer system 1900 can also include one or more secondary storage devices or memory 1910. Secondary memory 1910 can include, for example, a hard disk drive 1912 and/or a removable storage device or drive 1914. Removable storage drive 1914 can be a floppy disk drive, a magnetic tape drive, a compact disk drive, an optical storage device, tape backup device, and/or any other storage device/drive.

Removable storage drive 1914 can interact with a removable storage unit 1918. Removable storage unit 1918 can include a computer-usable or readable storage device having stored thereon computer software (control logic) and/or data. Removable storage unit 1918 can be a floppy disk, magnetic tape, compact disk, DVD, optical storage disk, and/or any other computer data storage device. Removable storage drive 1914 can read from and/or write to removable storage unit 1918.

Secondary memory 1910 can include other means, devices, components, instrumentalities, or other approaches for allowing computer programs and/or other instructions and/or data to be accessed by the computer system 1900. Such means, devices, components, instrumentalities, or other approaches can include, for example, a removable storage unit 1922 and an interface 1920. Examples of the removable storage unit 1922 and the interface 1920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1900 can further include a communication or network interface 1924. Communication interface 1924 can enable computer system 1900 to communicate and interact with any combination of external devices, external networks, external entities, etc. (individually and collectively referenced by reference number 1928). For example, communication interface 1924 can allow computer system 1900 to communicate with external or remote devices 1928 over communications path 1926, which can be wired and/or wireless (or a combination thereof), and which can include any combination of LANs, WANs, the Internet, etc. Control logic and/or data can be transmitted to and from computer system 1900 via communication path 1926.

Computer system 1900 can also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 1900 can be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1900 can be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas can be used, either exclusively or in combination with known or open standards.

In some embodiments, a tangible, non-transitory apparatus or article of manufacture including a tangible, non-transitory computer useable or readable medium having control logic (software) stored thereon can also be referred to herein as a computer program product or program storage device. This includes, but is not limited to, computer system 1900, main memory 1908, secondary memory 1910, and removable storage units 1918 and 1922, as well as tangible articles of manufacture embodying any combination of the foregoing. Such control logic, when executed by one or more data processing devices (such as computer system 1900), can cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 19. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities shown in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   receiving, by a third-party component from a network component, a copy of a first data packet related to a user component in a network;
   deriving, by the third-party component from the copy of the first data packet, first network data based on header contents of the first data packet;
   ordering, by the third-party component from a distributed ledger, a transaction relating to the first network data, wherein the transaction comprises second network data derived from a previous data packet;
   determining, by the third-party component, that the first and second network data meet or exceed a first condition of a first smart contract that comprises the first condition and an associated first network action, wherein the associated first network action is related to a first network function of the network component;
   sending, by the third-party component, the first condition of the first smart contract and the first and second network data of the first data packet to another third-party component;
   receiving, by the third-party component from the other third-party component, a validation that the first and second network data meet or exceed the first condition of the first smart contract; and
   performing the associated first network action on the network.

2. The method of claim 1, further comprising:
   identifying, by the third-party component, the first smart contract based on one or more of the first network data and the first network function.

3. The method of claim 2, wherein identifying the first smart contract comprises:
   identifying the first smart contract among the first smart contract and a second smart contract based on the first and second network data, wherein the second smart contract comprises a second condition and an associated second network action.

4. The method of claim 1, further comprising:
   storing, by the third-party component, the first smart contract at the third-party component or on the distributed ledger.

5. The method of claim 1, wherein at least one of the network components and the third-party components is located at an edge of the network.

6. The method of claim 1, wherein at least one of the network components and the third-party components is located at a center of the network.

7. The method of claim 1, wherein the network function comprises performing a corrective action or a preventive action in response to the first and second network data.

8. The method of claim 7, wherein the corrective action or the preventive action relates to application scaling for one or more user devices or cost optimization for the network.

9. The method of claim 1, wherein determining that the first and second network data meet or exceed the first condition comprises determining whether a network usage per user or a group of users meet or exceed a predetermined threshold.

10. The method of claim 1, wherein performing the associated first network action comprises scaling up one or more edge computing network components.

11. A system, comprising:
    a memory; and
    a processor coupled to the memory and configured to:
        receive, from a network component, a copy of a first data packet related to a user component in a network;
        derive from the copy of the first data packet, first network data based on header contents of the first data packet;
        order, from a distributed ledger, a transaction relating to the first network data, wherein the transaction comprises a second network data derived from a previous data packet;
        determine that the first and second network data meet or exceed a first condition of a first smart contract that comprises the first condition and an associated first network action, wherein the associated first network action is related to a first network function of the network component;
        send the first condition of the first smart contract and the first and second network data of the first data packet to a third-party component;
        receive, from the third-party component, a validation that the first and second network data meet or exceed the first condition of the first smart contract; and
        performing the associated first network action on the network.

12. The system of claim 11, wherein the processor is further configured to:
    identify the first smart contract based on one or more of the first network data and the first network function.

13. The system of claim 12, wherein, to identify the first smart contract, the processor is configured to:
    identify the first smart contract among the first smart contract and the second smart contract based on the first and second network data, wherein the second smart contract comprises a second condition and an associated second network action.

14. The system of claim 11, wherein the processor is further configured to:
store the first smart contract at the third-party component or on the distributed ledger.

15. The system of claim 11, wherein at least one of the network components and the processor is located at an edge of the network.

16. The system of claim 11, wherein the network function comprises performing a corrective action or a preventive action in response to the first and second network data.

17. The system of claim 16, wherein the corrective action or the preventive action relates to application scaling for one or more user devices or cost optimization for the network.

18. A non-transitory computer-readable device having instructions stored thereon that, when executed by at least one computing device, cause the at least one computing device to perform operations comprising:
receiving, by a third-party component from a network component, a copy of a first data packet related to a user component in a network;
deriving, by the third-party component from the copy of the first data packet, first network data based on header contents of the first data packet;
ordering, by the third-party component from a distributed ledger, a transaction relating to the first network data, wherein the transaction comprises a second network data derived from a previous data packet;
determining, by the third-party component, that the first and second network data meet or exceed a first condition of a first smart contract that comprises the first condition and an associated first network action, wherein the associated first network action is related to a first network function of the network component:
sending, by the third-party component, the first condition of the first smart contract and the first and second network data of the first data packet to another third-party component;
receiving, by the third-party component from the other third-party component, a validation that the first and second network data meet or exceed the first condition of the first smart contract; and
performing the associated first network action on the network.

19. The non-transitory computer-readable device of claim 18, wherein the instructions, when executed by the at least one computing device, cause the at least one computing device to perform an operation comprising:
storing, by the third-party component, the first smart contract at the third-party component or on the distributed ledger.

20. The non-transitory computer-readable device of claim 18, wherein at least one of the network component and the third-party component is located at an edge of the network.

* * * * *